(12) United States Patent  (10) Patent No.: US 8,730,387 B2
Cordes  (45) Date of Patent: May 20, 2014

(54) SCAN STAND SYSTEM FOR IMAGE CAPTURE

(76) Inventor: Patrick G. Cordes, Yorba Linda, CA (US)

( * ) Notice: Subject to any disclaimer, the term of this patent is extended or adjusted under 35 U.S.C. 154(b) by 0 days.

(21) Appl. No.: 13/451,899

(22) Filed: Apr. 20, 2012

(65) Prior Publication Data

US 2012/0274842 A1 Nov. 1, 2012

Related U.S. Application Data

(60) Provisional application No. 61/479,807, filed on Apr. 27, 2011, provisional application No. 61/487,488, filed on May 18, 2011, provisional application No. 61/536,720, filed on Sep. 20, 2011.

(51) Int. Cl.
H04N 5/225 (2006.01)

(52) U.S. Cl.
USPC .......................................................... 348/373

(58) Field of Classification Search
CPC .............................................. H04N 2201/0436
USPC .......................................................... 348/373
See application file for complete search history.

(56) References Cited

U.S. PATENT DOCUMENTS

| 4,776,688 A * | 10/1988 | Ushiro et al. ................... 353/66 |
| 4,916,550 A * | 4/1990 | Miyake et al. ................. 358/471 |
| 5,010,420 A * | 4/1991 | Hasegawa et al. ............. 358/471 |
| 5,054,669 A * | 10/1991 | Zimbardi et al. .............. 224/406 |
| 5,325,970 A * | 7/1994 | Dillon et al. ................... 206/576 |
| 5,920,342 A * | 7/1999 | Umeda et al. ............. 348/211.14 |
| 6,317,155 B1* | 11/2001 | Ohyama ........................ 348/373 |
| 6,540,415 B1* | 4/2003 | Slatter et al. .................. 396/428 |
| 8,393,634 B2* | 3/2013 | Radlow et al. ................ 280/651 |
| 2004/0020484 A1* | 2/2004 | Skidmore et al. ........... 126/25 R |
| 2006/0077286 A1* | 4/2006 | Wenderski .................... 348/373 |
| 2007/0206115 A1* | 9/2007 | Kuo .............................. 348/373 |
| 2009/0093274 A1* | 4/2009 | Yamamoto .................... 455/566 |
| 2010/0321561 A1* | 12/2010 | Duncan et al. ................ 348/373 |

OTHER PUBLICATIONS www.dhdocks.com; "Lakeside Living", 2010, pp. 1-2.*

* cited by examiner

*Primary Examiner* — Gary C Vieaux
(74) *Attorney, Agent, or Firm* — Larry K. Roberts

(57) ABSTRACT

Embodiments of scan stand systems or kits for positioning a document or other object to be imaged or scanned in relation to an imaging device are described. Also described are embodiments of systems for video conferencing/telephony/scanning and optical projection functions.

15 Claims, 32 Drawing Sheets

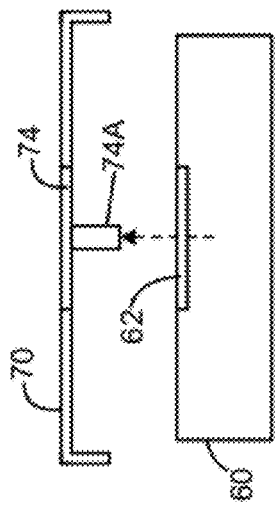
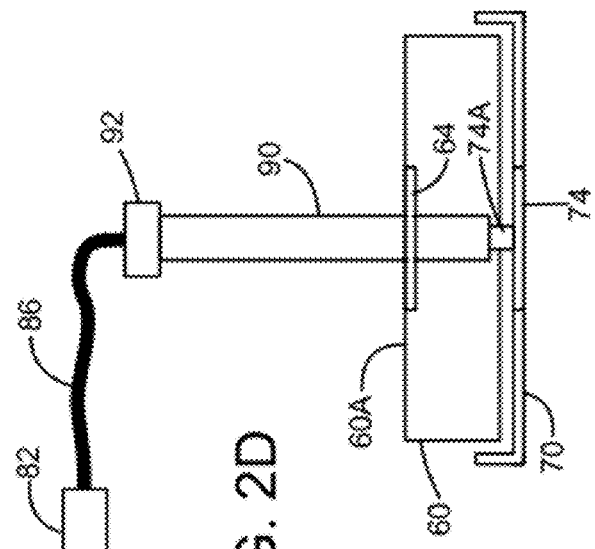
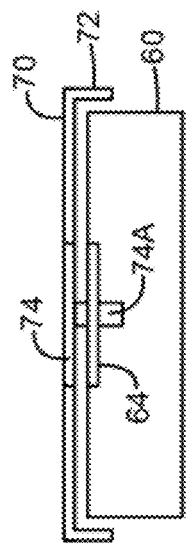
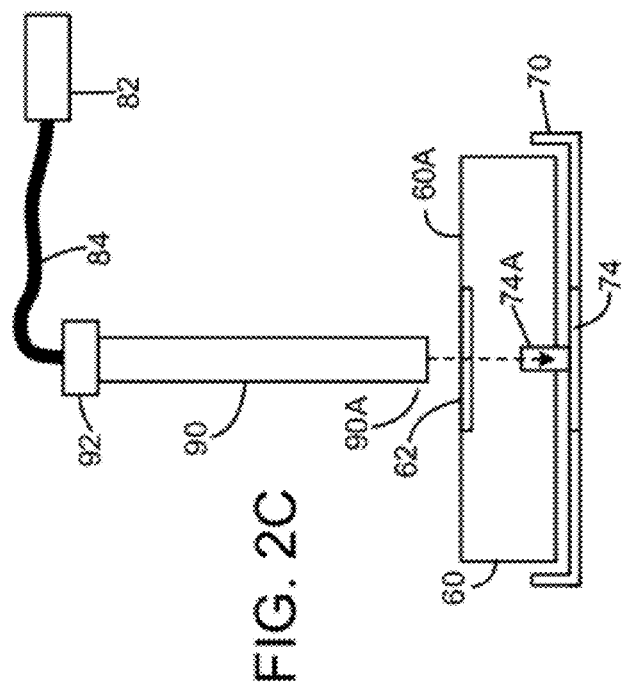

SCAN STAND SYSTEM FOR IMAGE CAPTURE

This application claims the benefit of U.S. Provisional Application No. 61/479,807, filed Apr. 27, 2011; U.S. Provisional Application No. 61/487,488, filed May 18, 2011, and U.S. Provisional Application No. 61/536,720, filed Sep. 20, 2011, the entire contents of which applications are hereby incorporated by reference.

BACKGROUND

A purpose of an exemplary embodiment is for document and other object positioning and electronic capture. Other embodiments provide additional image and video positioning and capture functions.

BRIEF DESCRIPTION OF THE DRAWINGS

Features and advantages of the disclosure will readily be appreciated by persons skilled in the art from the following detailed description when read in conjunction with the drawing wherein:

FIGS. 2A, 2B, 2C and 2D illustrate exemplary steps in assembling the scan stand system of FIG. 1 from a storage configuration to a scan configuration.

DETAILED DESCRIPTION

Figure 1:
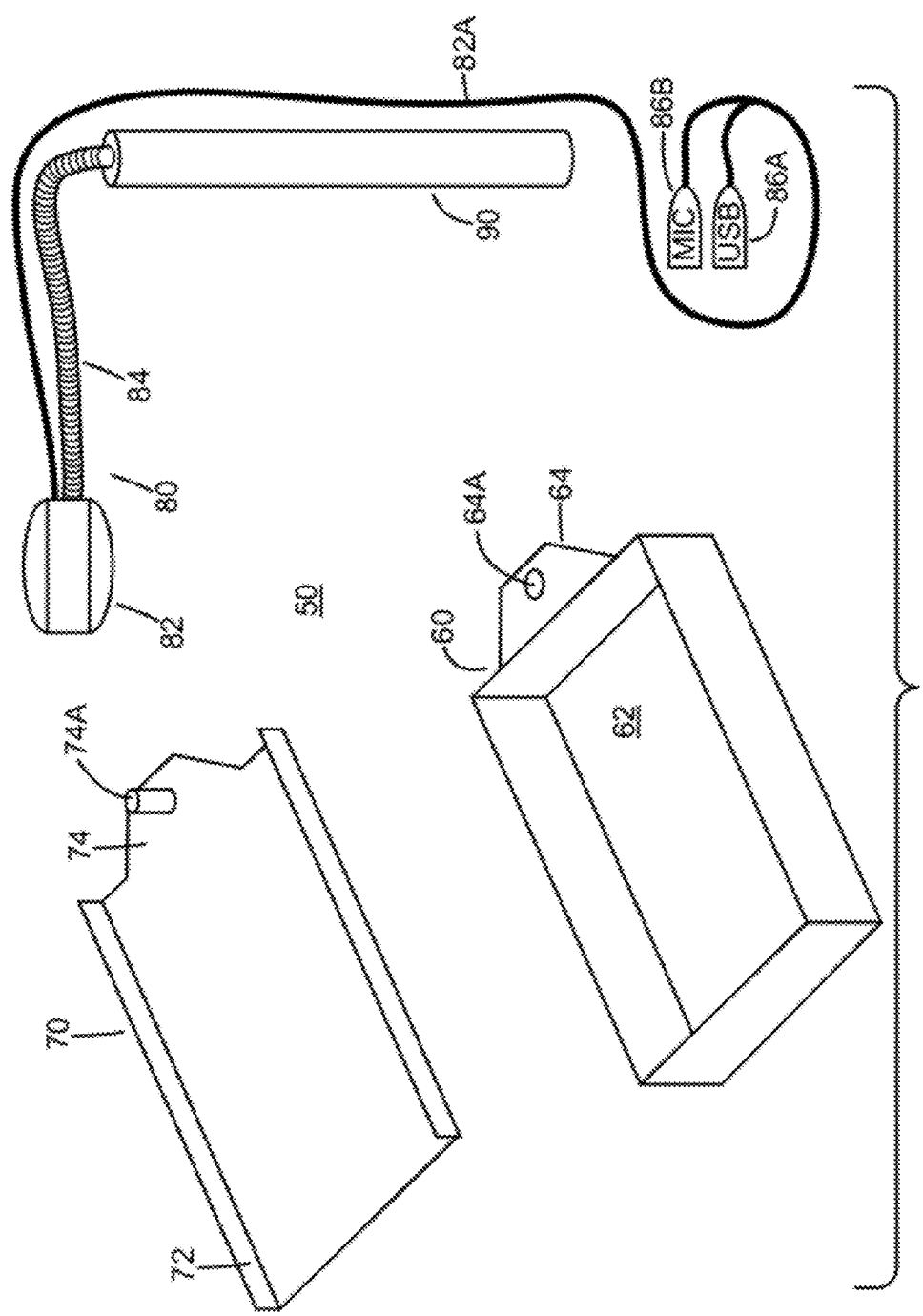
FIG. 1 is a diagrammatic isometric illustration of components of an exemplary embodiment of a scan stand system.

In the following detailed description and in the several figures of the drawing, like elements are identified with like reference numerals. The figures may not be to scale, and relative feature sizes may be exaggerated for illustrative purposes.

FIG. 1 illustrates components of an exemplary embodiment of a scan stand system 50. This embodiment includes a box 60, a box lid 70 and a camera and post system 80. The box 60 provides a storage space 62 which may be used to store the system 80 when not in use, and also includes a tab 64 protruding from an upper lateral edge of the box. The tab has an opening 64A formed therein. In an exemplary embodiment, the box 60 is fabricated as a unitary structure injected molded from a plastic material, e.g. ABS, although other materials may be used as well.

The lid 70 has longitudinal short side walls 72 formed on the longitudinal edges of the lid, and also a tab portion 74 protruding from a lateral end of the lid. A boss 74A is attached to the tab portion. In an exemplary embodiment, the box lid 70 is fabricated as a unitary structure injected molded from a plastic material, e.g. ABS, although other materials may be used as well.

The camera and post system 80 includes a camera 82 with a wiring set connected to the camera, and having a connector 86A at a distal end for connection to a computer such as personal computer. In an exemplary embodiment the connector 86A is a USB connector, but the type of connector will depend on the particular camera system employed in the system. Also shown in FIG. 1 is a microphone connector 86B which carries audio signals picked up by a microphone built in to the camera. The microphone connector is typically not used in the document scanning mode, but may be utilized to record commentary regarding documents being scanned. Typical commercially available webcam devices provide an audio output as well as a video or image output. The camera 82 has a flexible "goose neck" support 84 connected to the camera for supporting the camera in a desired position.

Figure 1A:
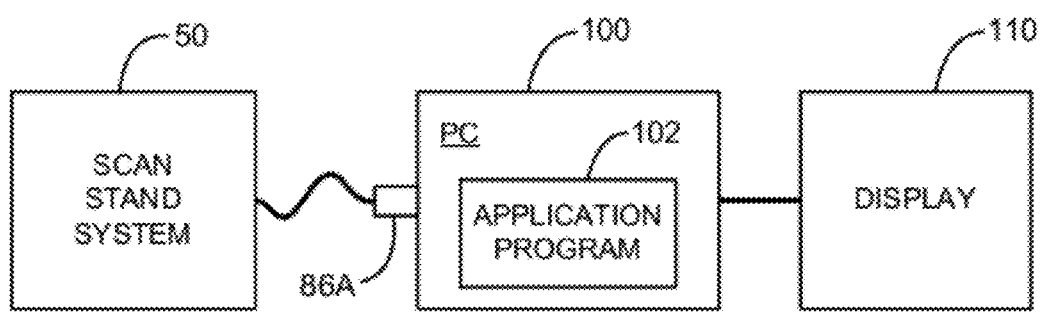
FIG. 1A is a schematic block diagram illustrating an exemplary embodiment of an image capture system employing the scan stand system.
Figure 1B:
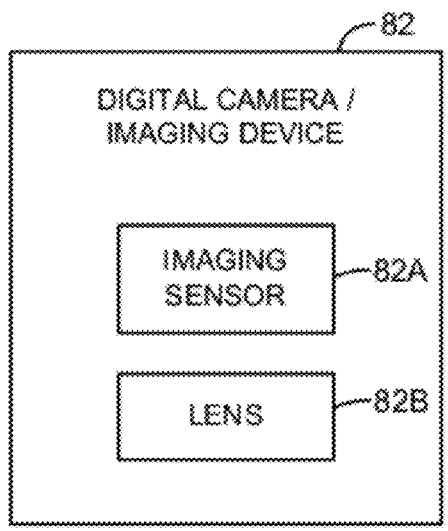
FIG. 1B is a simplified block diagram of an exemplary embodiment of a digital camera or imaging device.

Flexible webcams are commercially available with such flexible neck supports, for the camera 82. For example, a flexible 5.0 Megapixel USB PC Camera Webcam with manual focus, commercially available from marketers such as Amazon, is suitable for the purpose as camera 82. In an exemplary embodiment, the camera 82 has an electronic imaging sensor 82A and a lens 82B, with an optical field of view for its imaging sensor 82A (FIG. 1B). Preferably the camera field of view is wide enough to capture an electronic image of the entire surface of a workpiece such as a document. The image is captured while the camera is stationary. The electronic image may be transferred to a computer or other device having an electronic memory for storing or processing the image.

The distal end of the flexible neck portion 84 is attached to a post structure 90. In an exemplary embodiment, the post structure is fabricated from a length of hollow PVC pipe, but other post embodiments may alternatively be employed.

FIGS. 2A-2D illustrate setup of the system 50. FIG. 2A shows the box 60 and lid 70 in a storage condition, with the lid positioned on the open top of the box, and the side walls 72 straddling the longitudinal walls of the box. The boss 74A is sized to fit into the hole 64A formed in the tab 64 of the box 60, and serves to fix the longitudinal position of the lid relative to the box. The camera and post system 80 can be stored in the box in the storage condition of FIG. 2A.

To assemble the system 50 for use, the lid 70 is removed from the box (FIG. 2B, and placed under the bottom of the box, as illustrated in FIG. 2C, with the boss 74A now positioned under the hole formed in the tab 62 of the box. The box is placed in between the curled up edges or side walls of the lid. This prohibits the box from shifting from side to side. The flexible webcam assembly 82 and 84 is then attached to the post 90. The distal end 92 of the hollow post 90 is passed through the hole 64A formed in the box tab 64, and is positioned onto the boss 74A in the lid. With the distal end 92 fixed onto the boss 74A, and an intermediate portion of the post constrained by the tab 64 of the box, the post is secured in an upright position for imaging procedures. The distal end of the goose neck 85 of the camera 82 is secured to the upper end of the post, e.g. by a fitment structure 92. The fitment structure may be a PVC cap with an opening formed in it to accept the neck end in a press-fit or threaded arrangement, although other arrangements for attaching the goose neck to the post may be utilized. In other embodiments, the neck 86 may be long enough to attach directly to the box and the lid boss.

Once the system is assembled for scan operation, the position of the camera in relation to a document positioned on the surface 60A can be adjusted to calibrate or focus the camera lens on the surface 60A. Movement of the camera laterally and height wise relative to the box surface for this purpose is readily achieved by moving the goose neck 84. In an exemplary embodiment, the camera calibration is facilitated by the user watching the camera image on the computer display, and moving the camera by flexing the goose neck to obtain the proper focus on the document surface, or by adjusting the manual focus on the webcam if the camera has such a feature. Thus, the focusing of the camera may be accomplished by previewing the image on the computer to which the camera is attached.

The wiring 82A is not shown in FIGS. 2A-2D for clarity.

Figure 3:
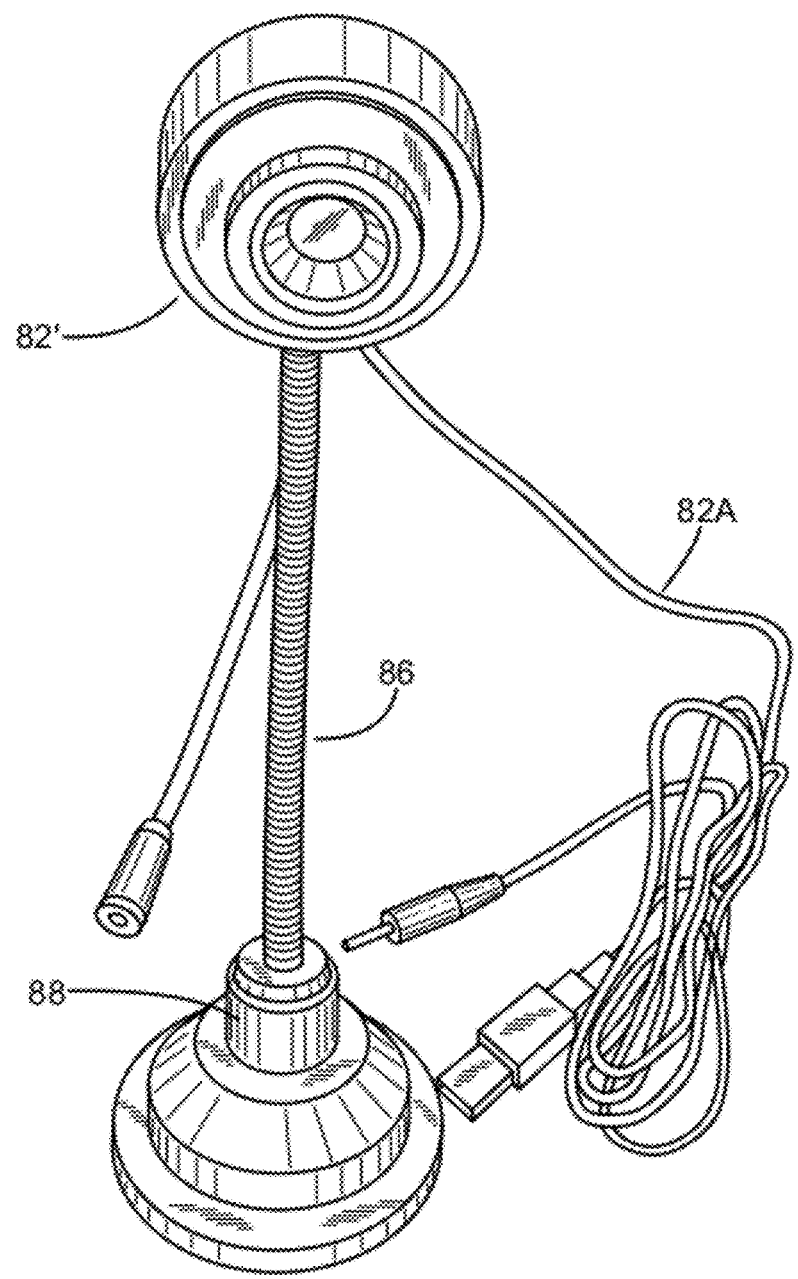
FIG. 3 illustrates one exemplary webcam with a flexible support neck suitable for use with the scan stand system.

FIG. 3 illustrates an exemplary type of webcam 82' suitable for the purpose of camera 82 and flexible goose neck 84. The distal end of the goose neck is attached to a base by a fitment 88. For use in the system 50, the distal end and fitment can be removed from the base, for attachment to the post 90.

An application of the system 50 is for document positioning for electronic capture for analysis. FIG. 1A illustrates in block diagram form an exemplary system for document capture utilizing the system 50. The system 50 is electronically coupled to a personal computer 100, by use of the wiring 82A and USB connector 86A. The computer 100 has an application program 102 configured to utilize the images provided by the system 50, and to control the camera to capture images of documents placed on the box. The images may be displayed on the computer display 110. For such an application, the inside dimensions of an exemplary embodiment of the box 60 is approx. 9 inches (W)×11.5 inches (L)×2.0 inches (H) to accommodate the documents to be electronically captured and analyzed. For this application, a document to be scanned in placed on the surface 60A of the box (FIGS. 2C and 2D), and the camera 92 is actuated to record an image of the document. Thus, by "scanning" a document is meant to electronically capture an image of the document for viewing and/or electronically storing. Typically the camera actuation is accomplished through a software application running on the computer system to which the webcam is connected, e.g. application program 102. The recorded image data is then uploaded to the connected computer for viewing, storage and/or processing by the software installed on the computer.

In the exemplary embodiment illustrated in FIG. 1, the flexible webcam is mounted into a ½" schedule 40 PVC cap, serving as the fitment 92, which has been drilled and tapped to accept the distal end of the goose neck of the flexible webcam. The PVC cap is attached onto a section of ½" section of schedule 40 PVC of appropriate height. Other structures for the post may alternatively be employed.

The system 50 facilitates the positioning of a document to be electronically captured for the analysis by the appropriate software. An exemplary embodiment of the system is optimally designed for 8.5"×11.0" (letter size) documents, but other embodiments may be designed for other document sizes, e.g., by adding filler pieces as appropriate. While this system is ideally designed for a letter (8.5"×11.0") sized documents, a system designed for legal sized (8.5"×14.0") documents or larger could also be used.

The flexible webcam 82 provides the versatility such that many different sizes of documents may be electronically captured. An exemplary embodiment of the webcam has a 5.0 megapixel image resolution, 10× optical zoom, F=4, 3 mm lens, with a flexible neck of approximately 6.0". A higher or lower resolution could be utilized if desired. An exemplary embodiment of the camera is a plug-n-play webcam model applicable to either a Windows based or Apple/Mac OS.

The flexible neck allows for versatility while providing stability. The flexible neck on the camera or webcam provides the versatility such that many different sizes of documents may be electronically captured using the same camera and post system.

By utilizing a semi-rigid platform created by the flexible arm 86, an inexpensive webcam can be used to electronically capture a document, instead of an auto-focusing camera which could be considerably more expensive. With the incorporation of the semi-rigid platform only a very simple initial calibration (focusing) of the webcam is typically performed.

Figure 4:
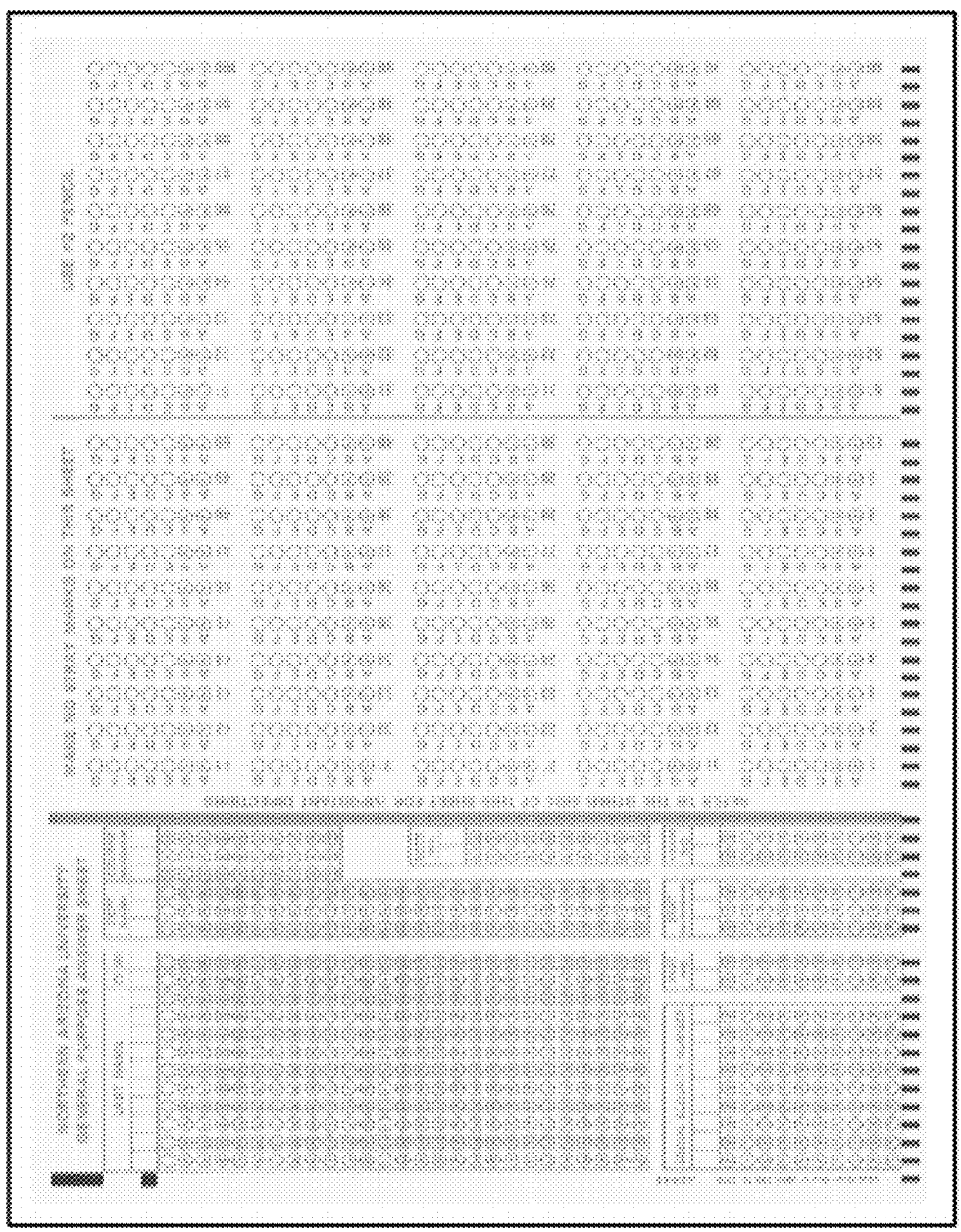
FIG. 4 illustrates an exemplary document type to be imaged by the scan stand system.

An exemplary application of the system 50 is with a student assessment data management system which is used to score test results from bubble scan test sheets (documents), such as the exemplary scan sheet illustrated in FIG. 4. One exemplary application with which the system may be employed is a commercially available application program marketed as "GradeCam" or "Illuminate dNA" by Illuminate Education, Inc., Irvine, Calif., which utilizes a "GradeCam Technology Plug-In," or other student data management applications. This application program can be used to control the webcam 82 and process the data resulting from imaging the scan sheet, e.g. to capture snapshots for bubble analysis of scan sheets for surveys and/or questionnaires. This allows for quick collection of data by using scan sheets or documents in areas where setting up computer data centers is impractical due to power requirement, space limitations or economic conditions. Of course, the system 50 may be used with other applications as well.

For example, the system may be used with a suitable application program and visual projector to project the images captured by the system onto a screen, e.g. for classroom use. Another exemplary software program with which the scan system may be employed is "YAWCAM," a webcam software application program.

Figure 5:
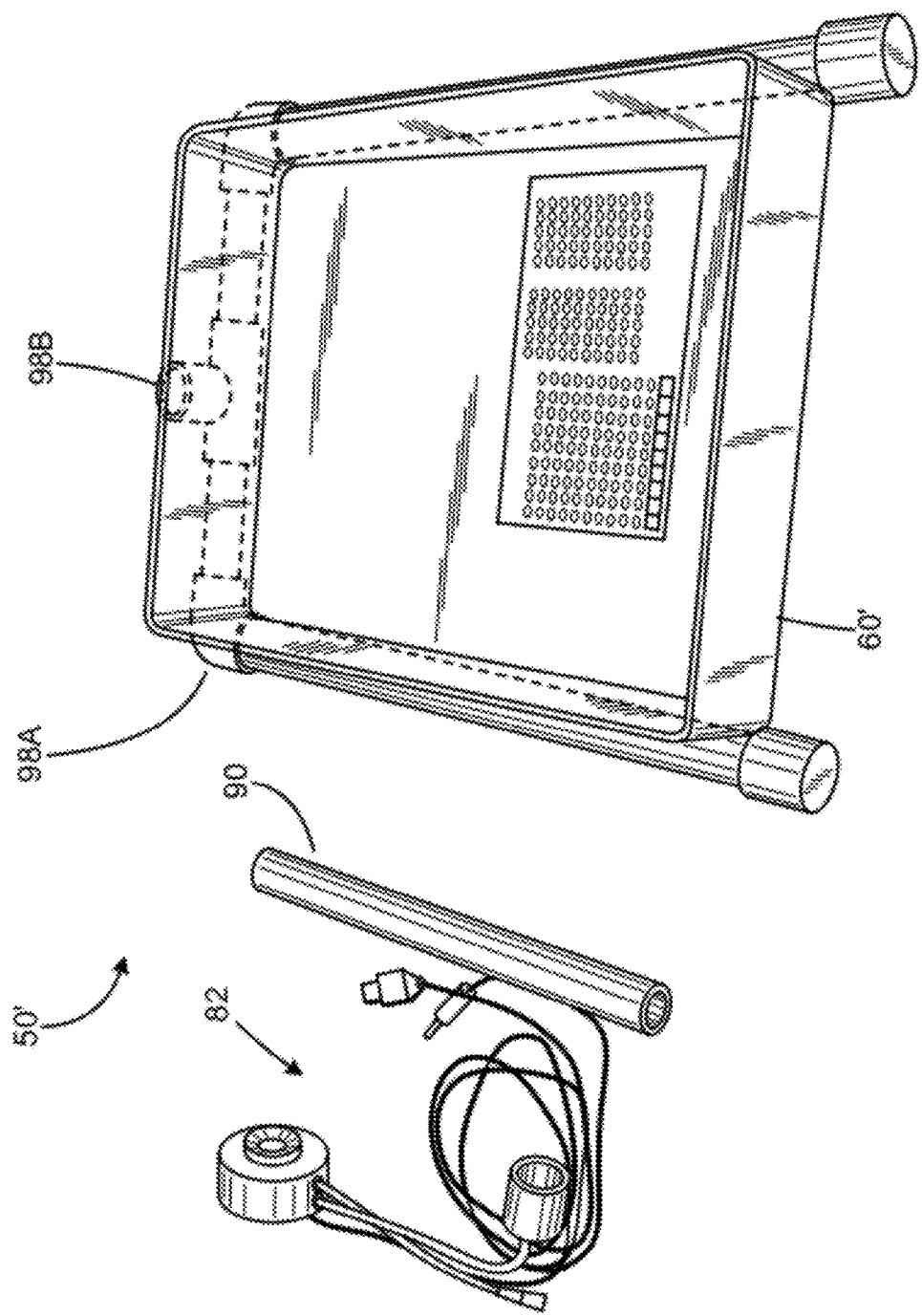
FIG. 5 illustrates another embodiment of a scan stand system in accordance with the invention, in a disassembled state.
Figure 6:
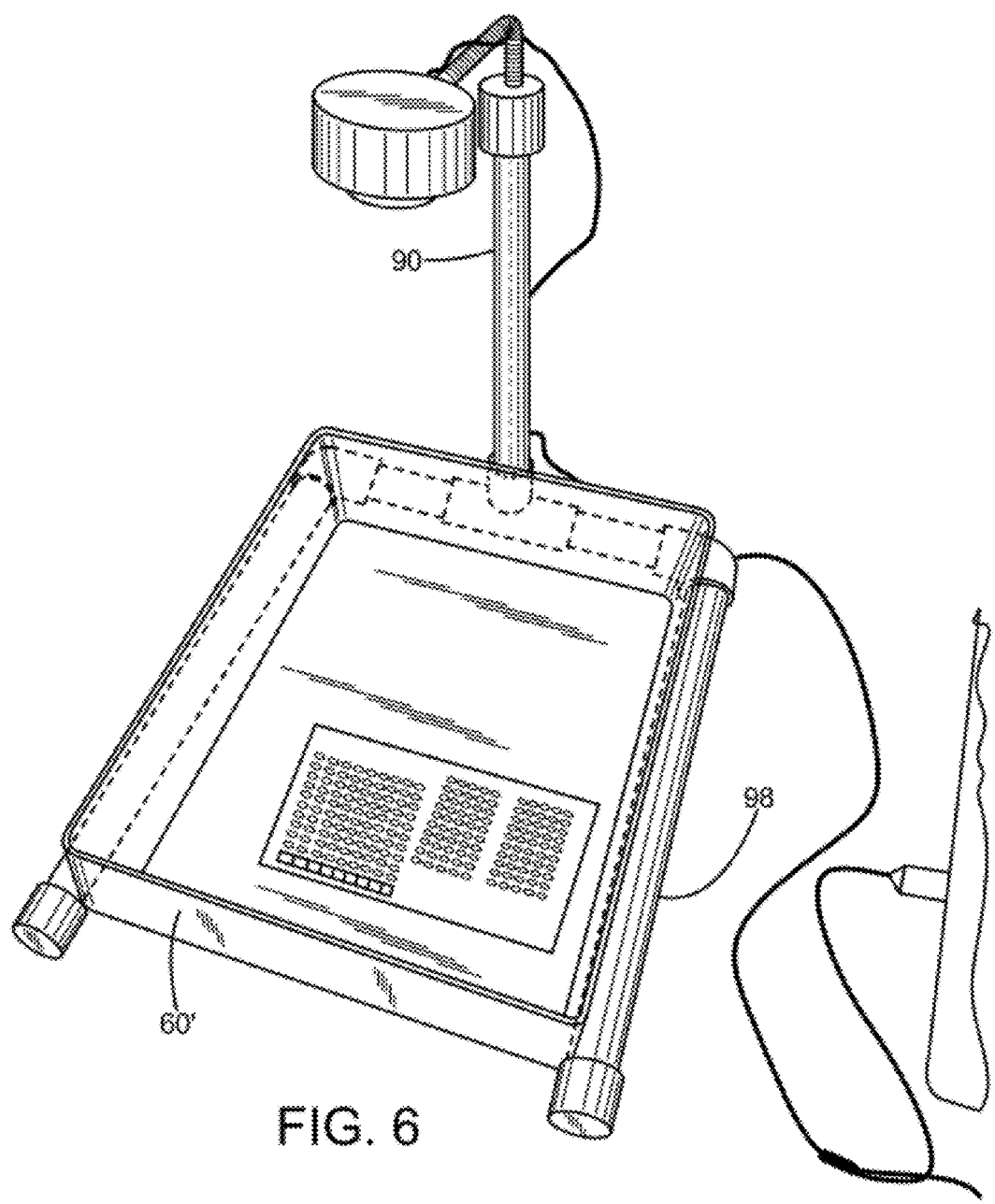
FIG. 6 illustrates the scan stand system of FIG. 5 in an assembled condition.
Figure 7:
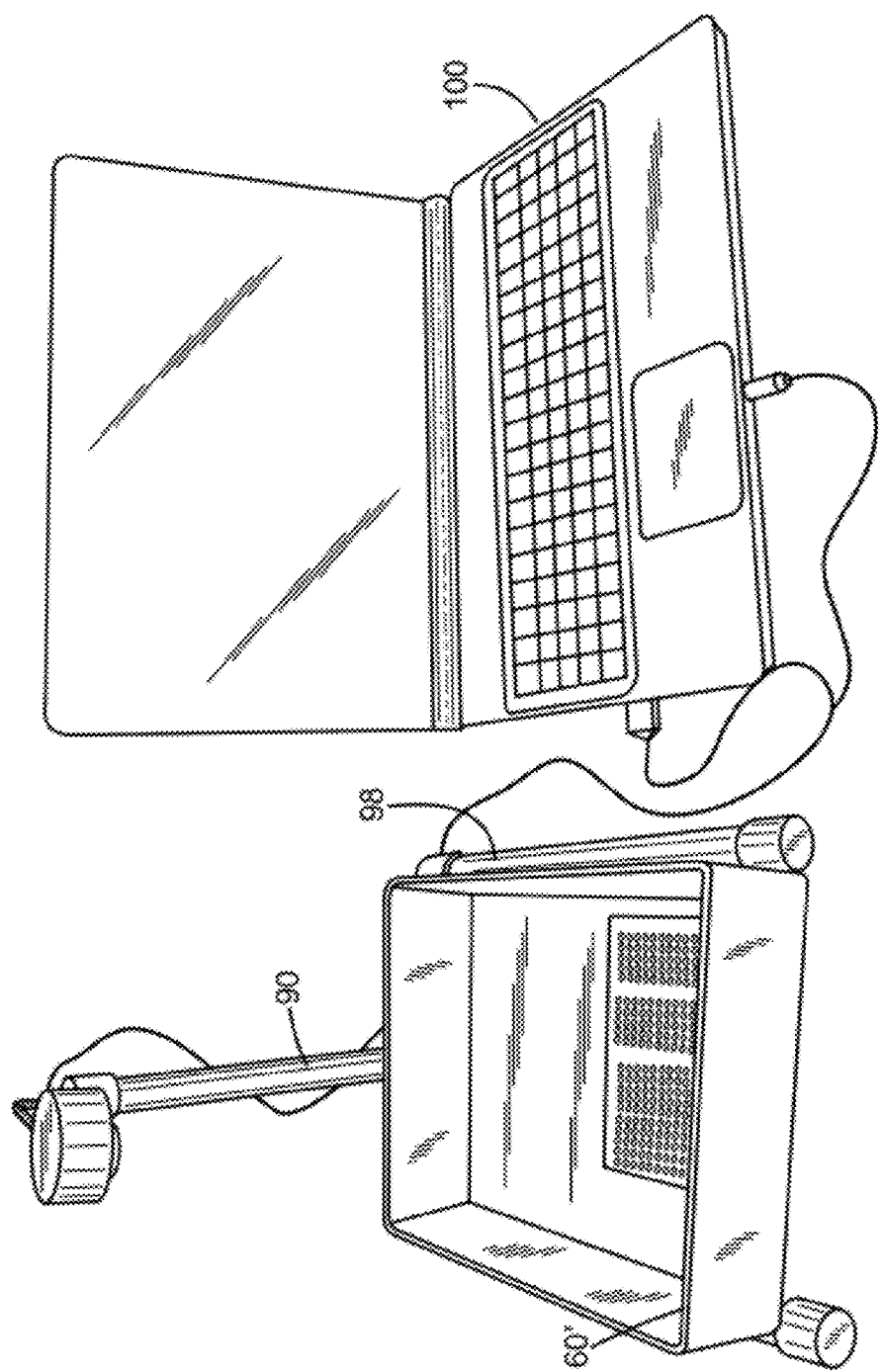
FIG. 7 illustrates the assembled scan stand system as in FIG. 6, connected to a computer for image transfer and processing.

FIGS. 5-7 illustrate another embodiment of a scan stand system 50'. The system employs a separate stand provided by a U-shaped base structure and the post 90, instead of integrating the post support into the box and lid structure as with the embodiment of FIG. 1. The base structure in this example is fabricated from PVC pipe lengths cut and attached together to form the U-shaped base, with a T-connector mounted in the mid-point of the connector section joining the two legs. The post 90 can be inserted into the T connector and the camera assembly 82 mounted to the post as in the embodiment illustrated in FIG. 1. The box 60' in this embodiment is formed by a drawer, with the document to be scanned placed in the drawer on the bottom surface thereof. The drawer could be omitted, and the document placed directly on a table surface supporting the stand. The camera wiring is connected to a personal computer, in this case a laptop computer, by the wiring as with the embodiment of FIG. 1.

Figure 8:
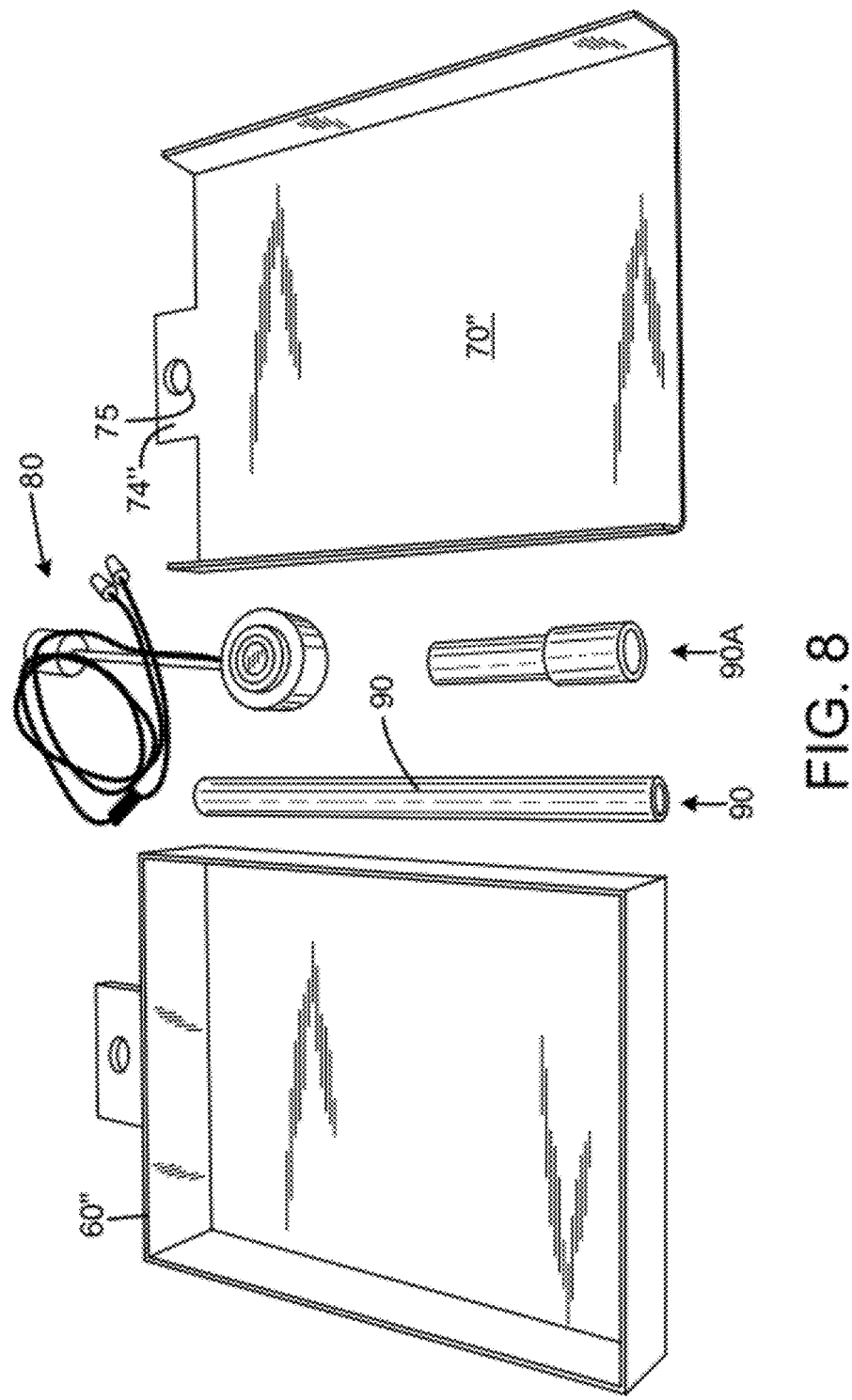
FIGS. 8-10 illustrate another embodiment of a scan stand system.
Figure 9:
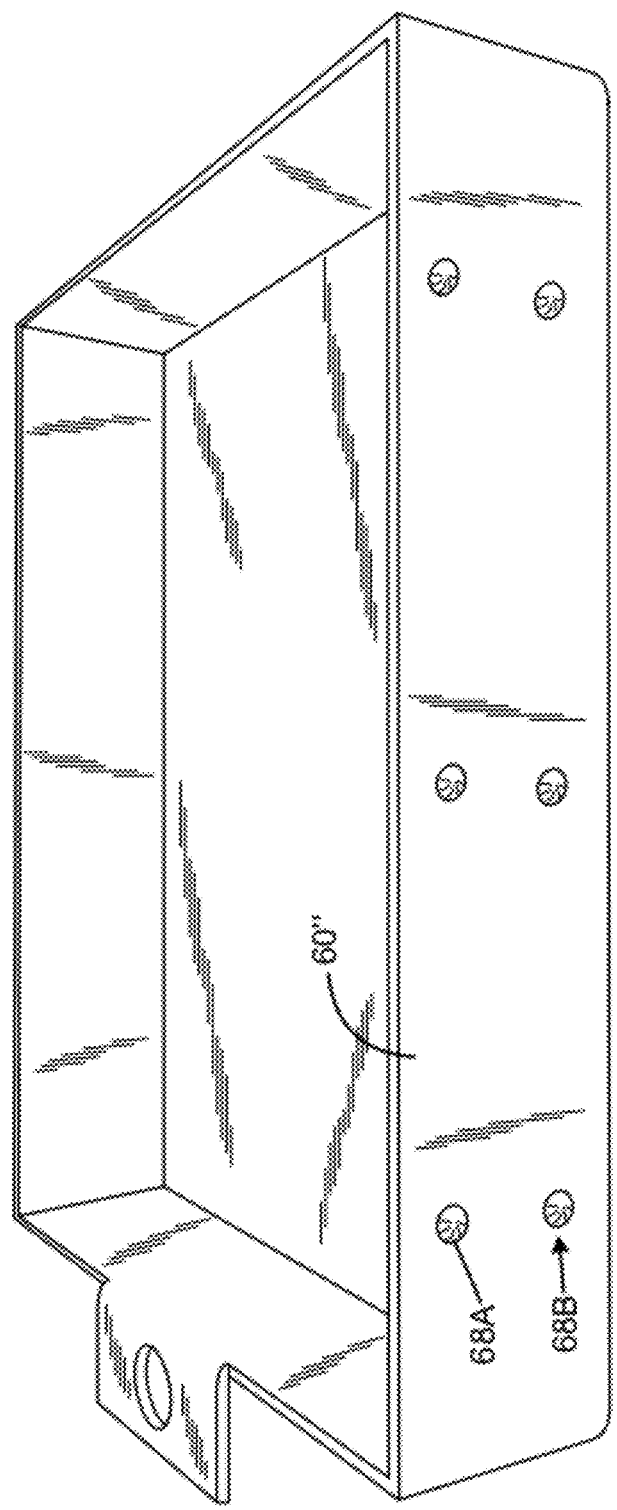
Figure 10:
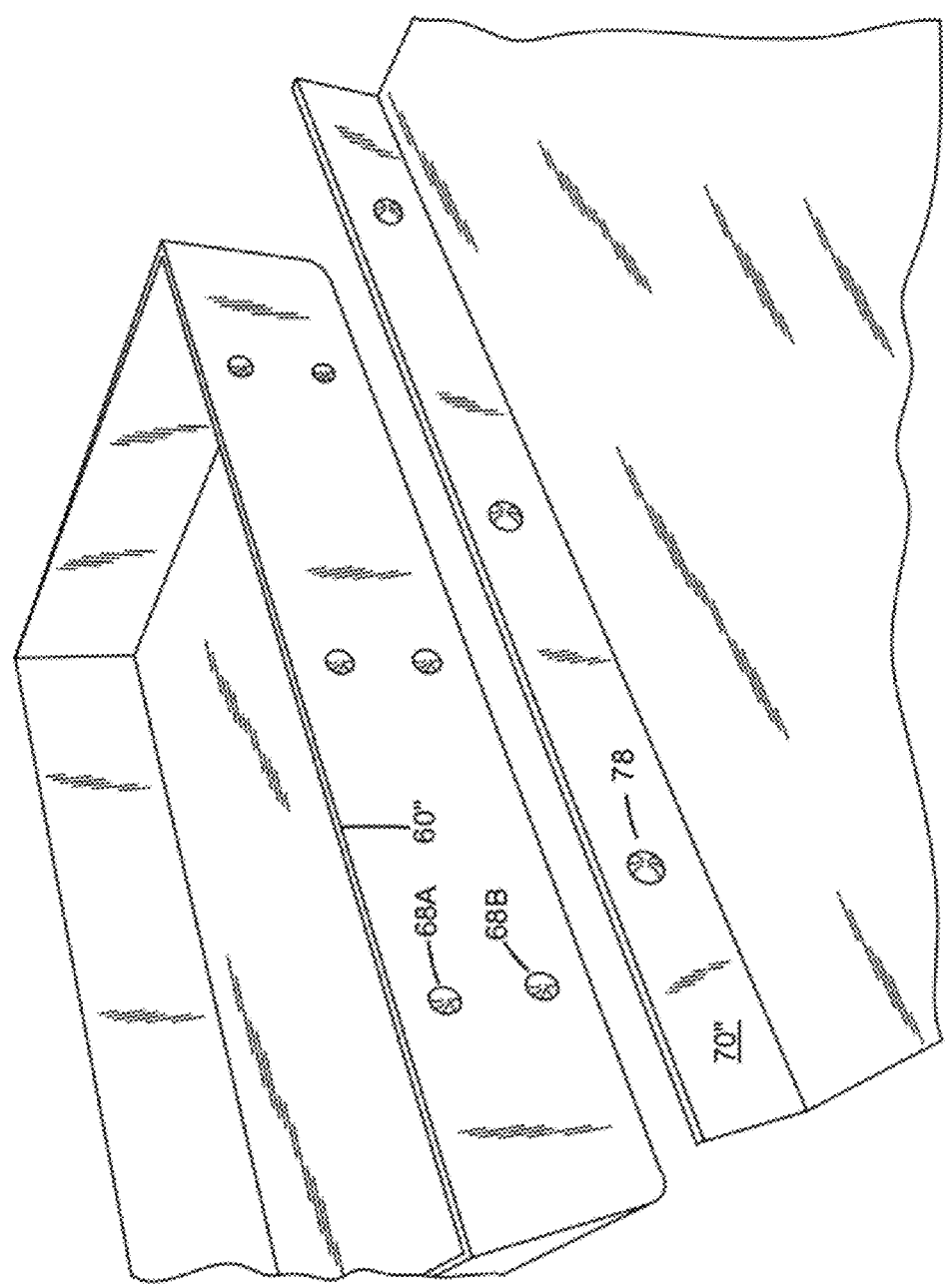

FIGS. 8-10 illustrate another embodiment of a scan stand system. This embodiment is similar to the embodiment of FIGS. 1-4, but has several differences. The system includes a box 60", a lid 70", an imaging device system 80, a support post 90 and a post extension 90A.

The extension 90A engages a fitting on the post 90, to provide the capability of raising the height of the camera above the box. Alternatively, the post 90 and extension 90A may be replaced with a telescoping post assembly to provide height adjustment throughout a range of heights.

The longitudinal side walls of the box are formed with several spaced dimple or relief features 68A, also spaced from the top edge of the box 60", and several spaced dimple features 68B, also spaced from the bottom edge of the box by a distance equal to the spacing distance of the dimples 68A from the top edge. Corresponding pairs of the dimples 68A and 68B are vertically aligned. The lid 70" has several bumps or protrusions 78 formed in the sidewalls.

The protrusions 78 are spaced from the depending edge of the sidewalls by a distance equal to the spacing distance of the dimples 68A and 68B from the top edge and bottom edge of the box. The dimples may be machined in the box sidewalls, formed by machining, or comprise holes formed through the sidewall. The protrusions are of suitable dimensions to fit into the dimple or relief features of the box, and may be formed by molding, adhesive attachment of protrusion elements, or the like. The dimples and protrusions are complementary, so that protrusions 78 engages the dimple or relief features 68A or 68B, to hold the lid in place relative to the box. Moreover, the protrusion features engage features 68A to hold the box lid in place on the box in a storage configuration, or engage features 68B to hold the box lid in place against the bottom of the box when the system is assembled for performing imaging. The engagement of the dimples and protrusions prevent movement of the lid longitudinally relative to the box.

The lid 70" does not have a boss for engagement with the post 90. The lid instead includes an opening 75 formed in the tab portion 74", sized to allow the end of the post to fit into the opening. Even though the lid is relatively thin, the engagement of the post 90 into the hole 75 will be sufficient for many applications to hold the post upright with the camera system 80 mounted to the post. The stability is enhanced by the attachment of the lid to the underside of the box by virtue of the engagement of the relief features 68AB and protrusions 78.

A further embodiment of a scan stand system 150 is illustrated in FIGS. 11-24. As with the embodiments described above, the system includes a drawer or box 160, with a detachable lid 170. The box 160 is configured to support vertically a plurality of posts, to provide additional usage flexibility. In this embodiment, the post supports includes three receptacles 164A, 164B and 164C, attached to an external wall of the box 170. Each receptacle is sized to receive a post 90 therein in a vertical position. In an exemplary embodiment, the box and lid are each fabricated in a rigid plastic material, e.g. by a molding process such as injection molding. The box and lid can be fabricated as respective unitary, one-piece structures.

Figure 11:
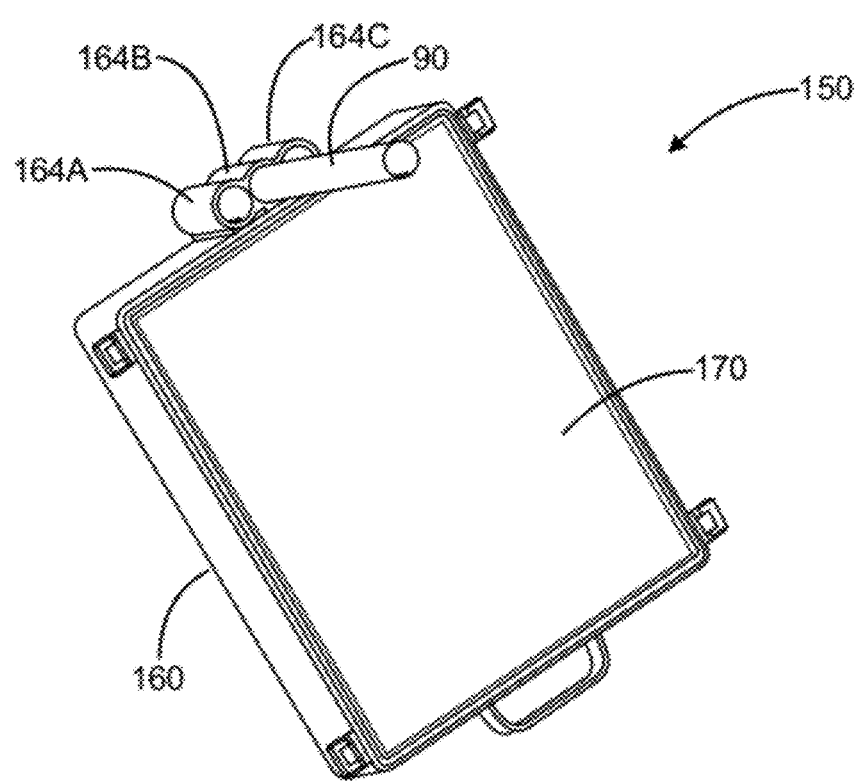
FIG. 11 is an isometric view of another embodiment of a video capture system, including a box, lid and camera support post in an assembled condition.
Figure 12:
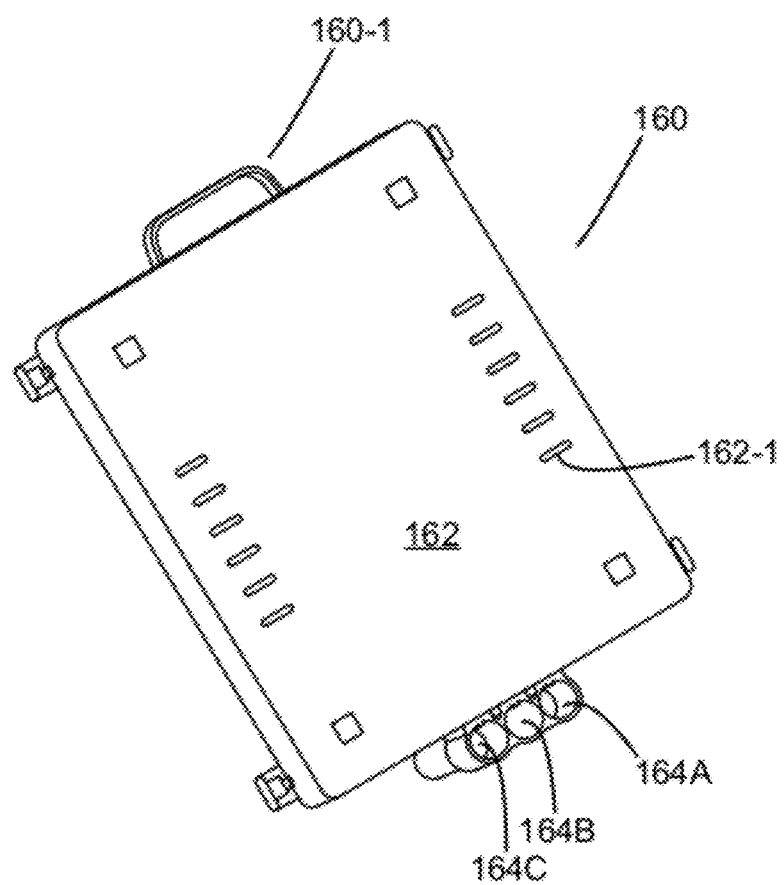
FIG. 12 is a bottom isometric view of the embodiment of FIG. 11, without the support post.

FIG. 11 shows the box 160 and lid 170 in an assembled condition. FIG. 12 shows the box 160 and lid 170 in an assembled, inverted position. The bottom wall 162 has a series of spaced pairs of slots 162-1 formed therein, to receive lid features when the lid is attached to the bottom of the box, as will be described more fully below.

Figure 13:
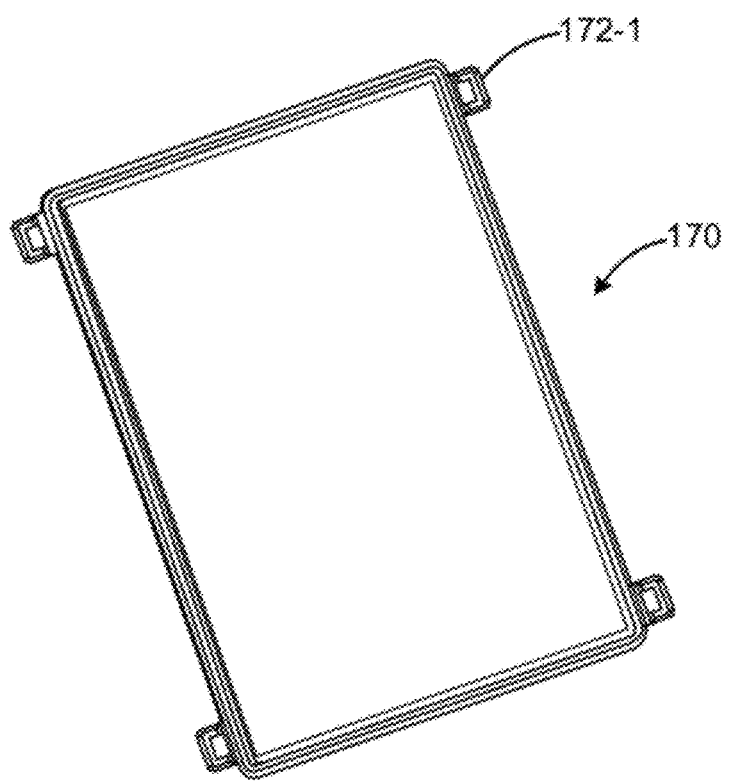
FIG. 13 illustrates the lid of the embodiment of FIG. 11 in a top isometric view.
Figure 14:
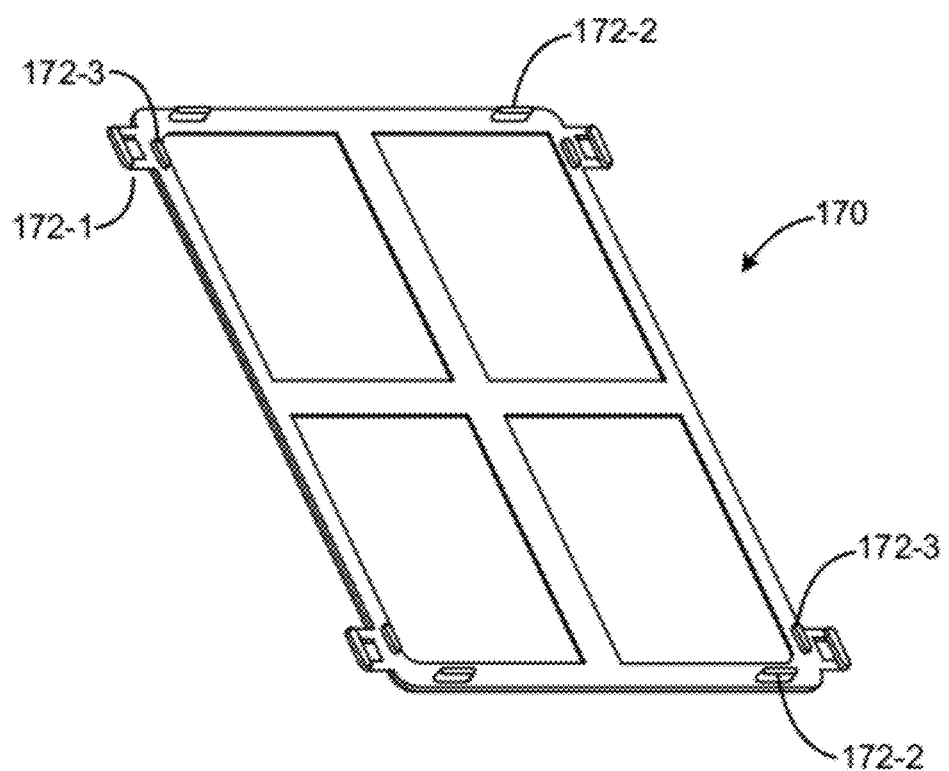
FIG. 14 is a bottom isometric view of the lid.

FIG. 13 illustrates the lid 170 in a top isometric view, illustrating the four tabs 172-1 protruding from the longitudinal sides of the lid. FIG. 14 is a bottom isometric view of the lid 170, illustrating in further detail the tabs 172-1. Two ribs 172-2 protrude from each end of the lid in spaced relation, and are configured for alignment with corresponding spaced slots 162-1 in the bottom of the box 170. The slots can be inserted into a desired pair of the slots 162-1, to secure the lid 170 onto the bottom of the box and accommodate larger document scanning and support than letter-size, for example. The lid also has respective pairs of ribs 172-1 each longitudinal side of the lid and protruding downwardly. The ribs 172-1 are configured to lie within the box 160 when the lid is in place as in FIG. 11, or to contact the bottom surface 162 of the box when the lid is placed onto the bottom of the box with the ribs in place in slots. The ribs 172-1 are shorter than the ribs 172-2, to allow the ribs 172-2 to be inserted into the slots 162-1 in the box 162.

Figure 15:
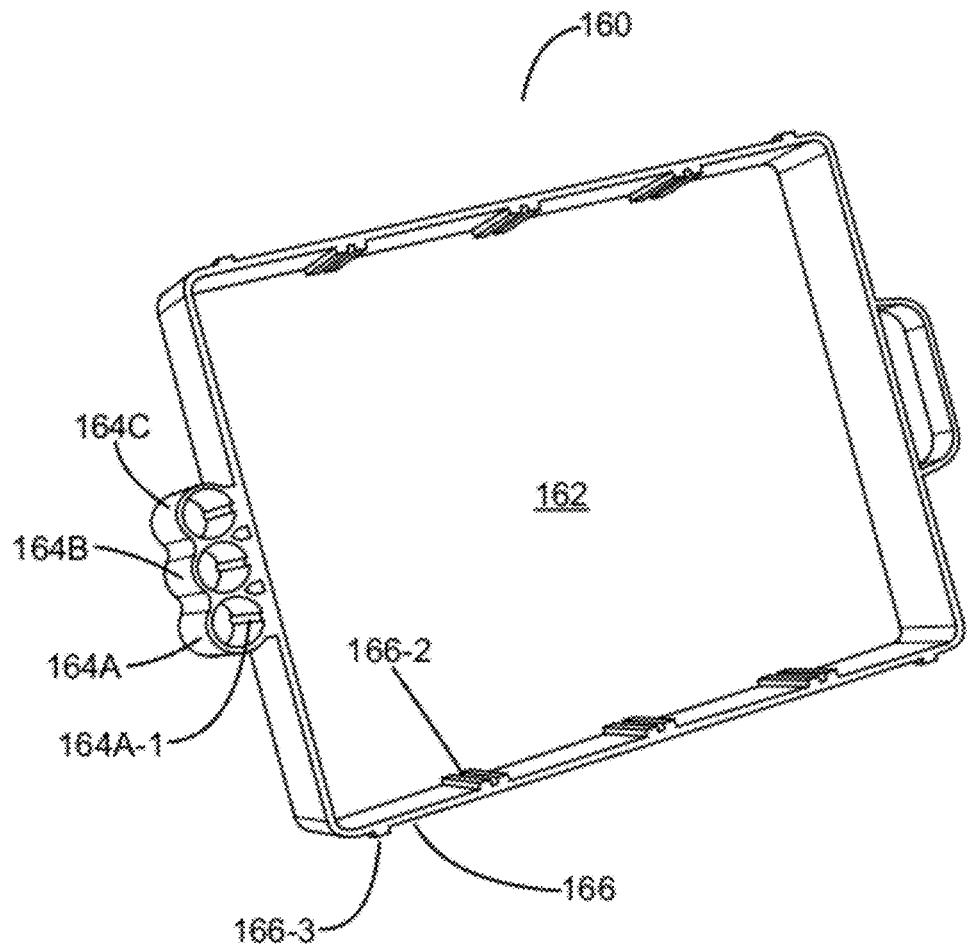
FIGS. 15 and 16 are respective top and bottom isometric views of an exemplary embodiment of the box of the embodiment of FIG. 11.
Figure 16:
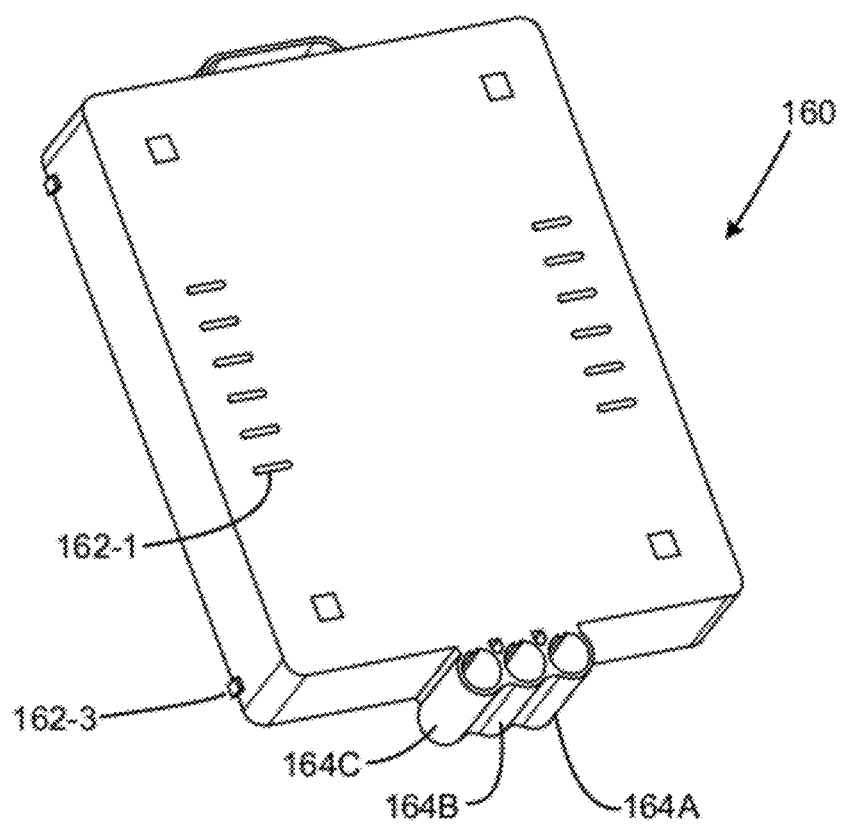

FIGS. 15 and 16 are respective top and bottom isometric views of an exemplary embodiment of the box 160, in which several pairs of engagement channels 166-2 are defined in the longitudinal sidewalls 166 of the box. The channel pairs are configured to receive partition walls to accommodate documents to be scanned which are smaller than a given size of the box, say letter size, for scan auto-positioning. This view also shows the keys in the respective post receptacles, e.g. key 164A-1, protruding from the inner receptacle wall, to control the depth of insertion of the post into the receptacle when the post is formed with a corresponding key feature, e.g. a post slot. Bosses 166-3 extend from the longitudinal sidewalls 166, and are engaged into openings in the tabs 172-1 of the lid when the lid is placed onto the box in the position shown in FIG. 11, helping to secure the lid to the box. The slots 162-1 in the bottom wall of the box are also visible in FIG. 16.

Figure 17:
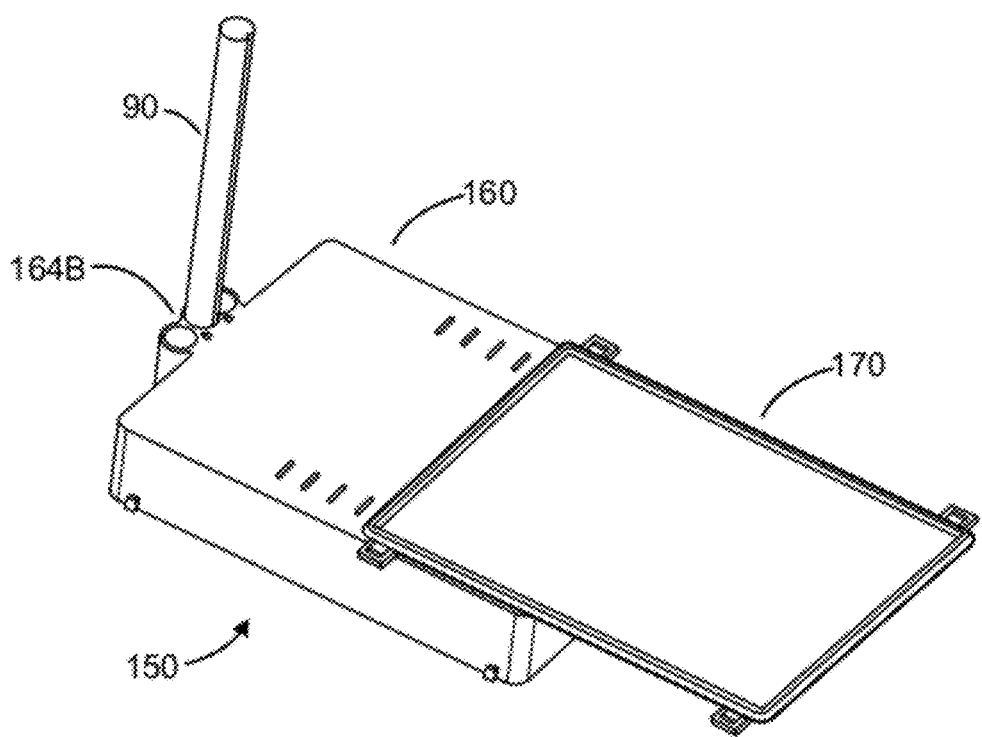
FIG. 17 is an isometric view of the system of FIG. 11 in an assembled configuration to support a document longer than the length of the box.

FIG. 17 is an isometric view of the system 150 in an assembled configuration to support a document longer than the length of the box 160. In this configuration, the lid 170 has been removed from the open top of the box 160, the box is turned over, and the lid positioned onto the bottom wall 162 of the box, with the ribs 172-2 engaged in respective slots 162-1 of the bottom wall. The cantilevered portion of the lid extending over the end of the box adds length to the support surface for a document to be scanned. The post supporting the camera can be positioned in one of the post receptacles from the bottom or from the top of the box 160, as shown in FIG. 17.

Figure 18A:
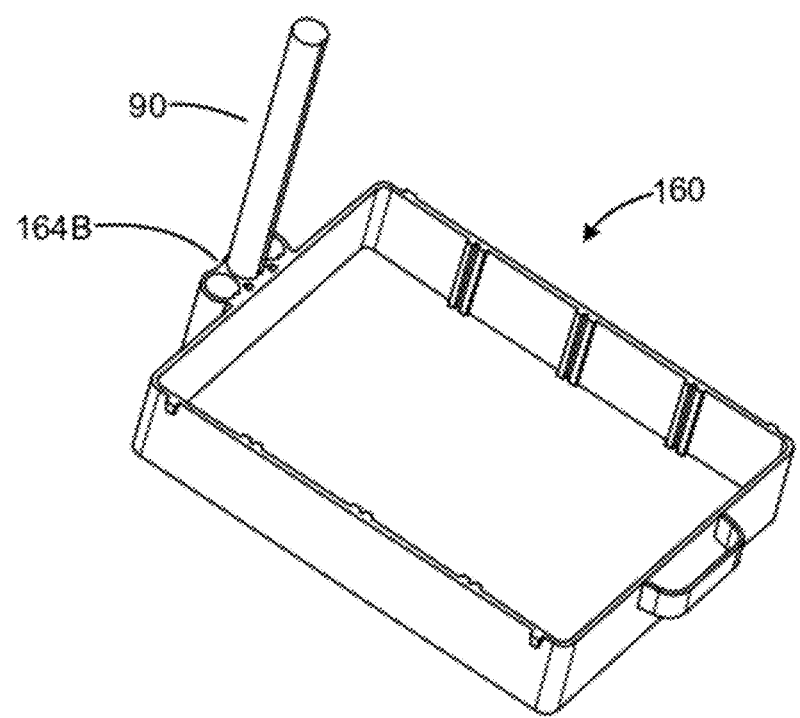
FIG. 18A is an isometric view of the box of the system of FIG. 11, showing the camera post inserted into position in a receptacle of the box.
Figure 18B:
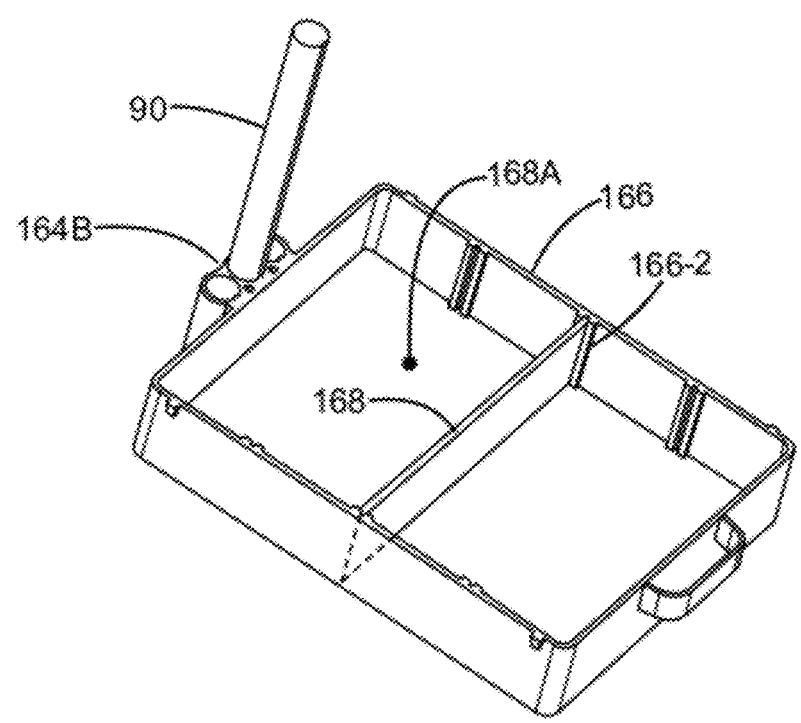
FIG. 18B is a similar view, but with a partition wall installed in the box.

FIG. 18A is an isometric view of the box 160, showing the camera post 90 inserted into position in receptacle 164B of the box. The box may be sized to accommodate a letter-sized document, in one exemplary embodiment, and the box thus auto-positions the document for scanning by a camera system mounted to the post 90, and described above regarding the embodiments of FIGS. 1-10. FIG. 18B is a similar view, but with a partition wall 168 inserted into one of the sets of channels 166-2 of the longitudinal side walls 166 of the box. A shorter document can be laid in the partition space 168A within the box for scanning.

Figure 19:
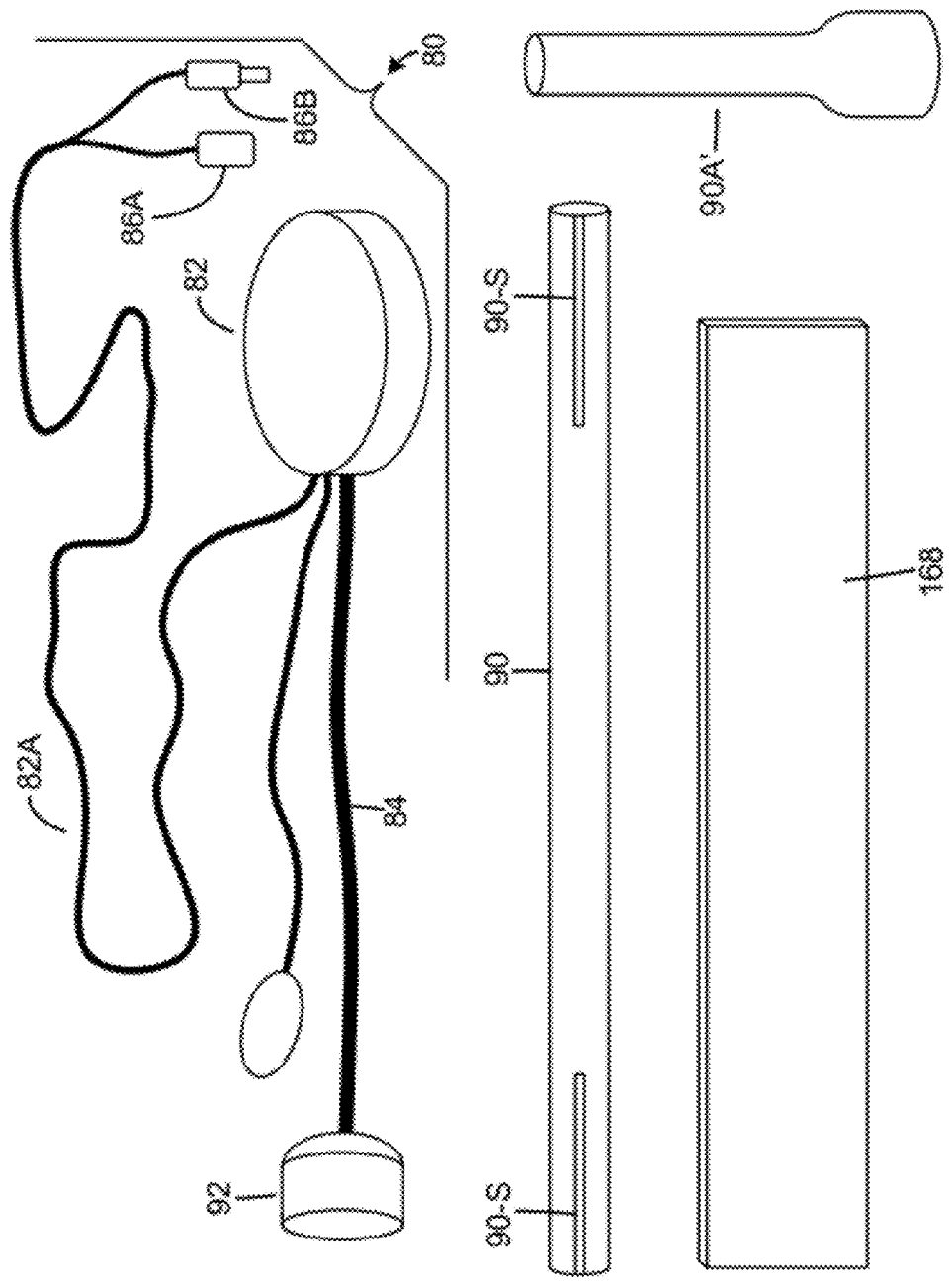
FIG. 19 illustrates exemplary assemblies for use with the box and lid of the system of FIG. 11.

FIG. 19 illustrates exemplary assemblies for use with the box 160 and lid 170. These include the camera assembly 80, as described above regarding the embodiment of FIG. 1, with web camera 82, wiring 82A, USB and audio connectors 86A and 86B, and flexible gooseneck 84. A fitting 92 may be used to attach the camera assembly to the post 90. The post 90 may have slots 90-S formed in each end as key features to mate with the keys formed in the post receptacles in the box. A post or stem extender 90A' may be provided to extend the height of the camera, if needed for a particular application. The scan box partition 168 is also shown in FIG. 19. All of these items shown in FIG. 19 may be stored in the box 160 during periods of non-use.

Figure 20:
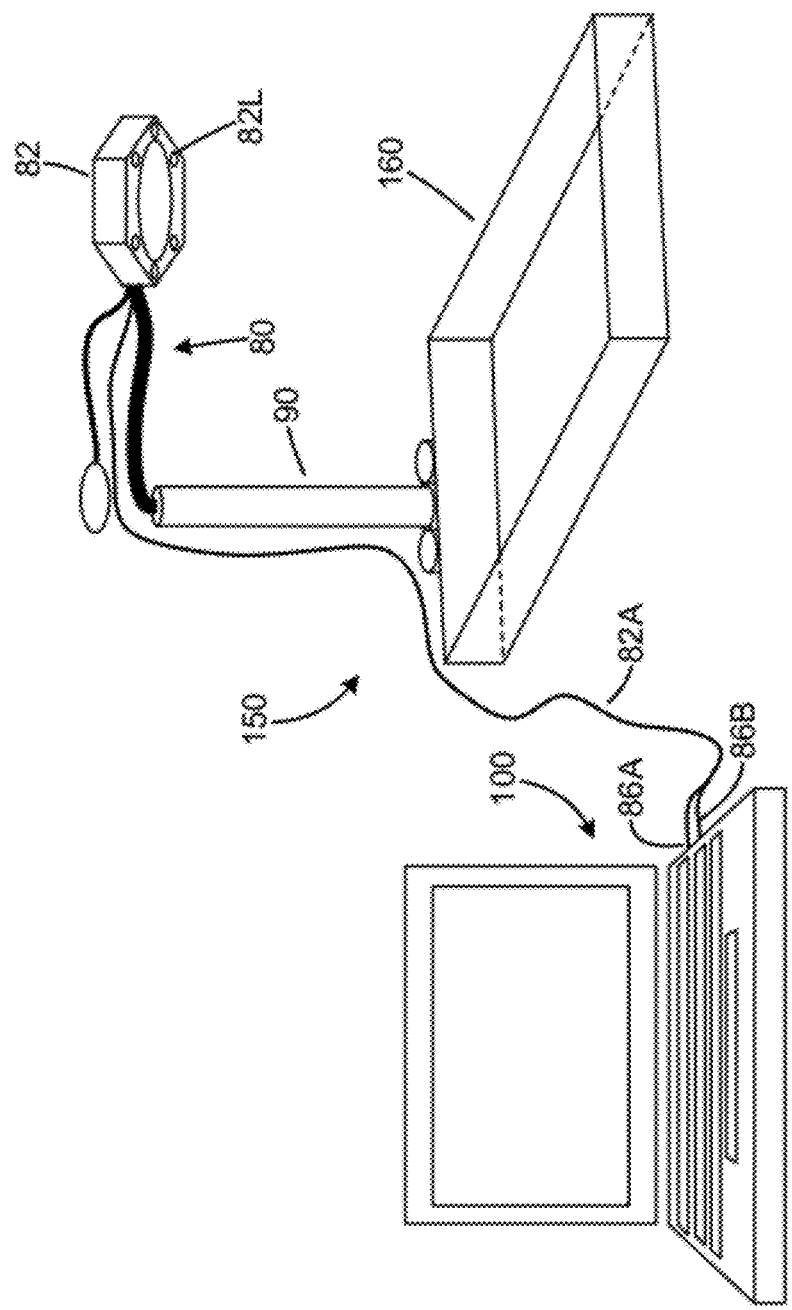
FIG. 20 illustrates the system of FIG. 11 in a typical document scan mode configuration, with the camera assembly mounted to the post, in turn mounted in a post receptacle of the box, and connected to a computer.

FIG. 20 illustrates the system 150 in a scan mode configuration, with the camera assembly mounted to the post 90, in turn mounted in a post receptacle of the box, and connected to a computer 100. In this scan mode configuration, the lid (not shown) is removed from the box, and a document to be scanned is placed in the box. Scanning will be performed under control of the application program running on the computer 100, as described above regarding the embodiment of FIGS. 1 and 1A.

The camera assembly 80 may be a webcam assembly as described above regarding the embodiments of FIGS. 1-10. Alternatively, the camera assembly may include lights 82L (FIG. 20) positioned on the camera 82 housing to provide illumination of the scene in the camera field of view. This may provide increased clarity in the images being captured by the camera assembly, leading to increased performance of the image capture function. Webcam assemblies incorporating LED lights are commercially available, e.g. the 6 LED light, with microphone, 2.0 pc webcam product available from Tianjin Huayue Technology Co., Ltd., Guangdong, China (Mainland).

Note that an advantage of one or more of the embodiments described herein include that the scan system is powered by connection to the computer, through a USB port for example, and no batteries or separate power connection is needed for these embodiments. In other embodiment, a power supply may be provided for the camera systems, if needed for a particular application.

Figure 21:
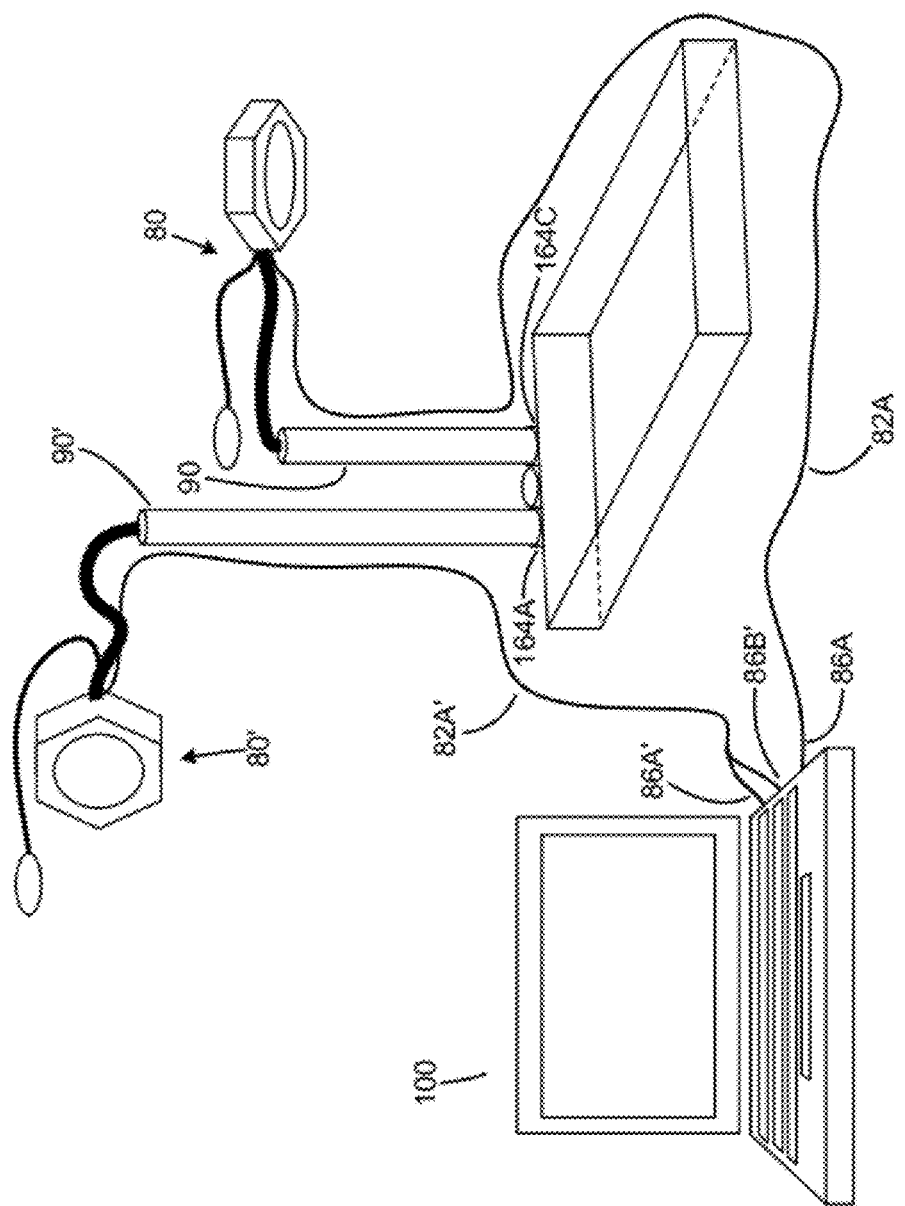
FIG. 21 illustrates an exemplary embodiment in which two camera assemblies utilizing the system of FIG. 11 are employed, and connected to a computer.

With a plurality of post receptacles on the box 160, the capability of the system 150 can be increased by use of a plurality of camera assemblies. FIG. 21 illustrates an exemplary embodiment in which two camera assemblies 80 and 80' are employed, and connected to computer 100. Camera assembly 80, supported on post 90 inserted in receptacle 164C, can be used as in the embodiments already discussed to scan documents supported by the box 160 or box-lid combination. The second camera assembly 80' is supported on post 90' inserted in post receptacle 164A and is also connected to the computer 100 by its wiring 82A' and USB connector 86A' and audio connector 86B'. The second camera assembly 80' can be used for a second application, e.g. as a convention webcam application to capture video and audio of an observed scene. In this case, the computer 100 will have a second application program running to utilize the signals from the second camera assembly 80'.

Figure 22:
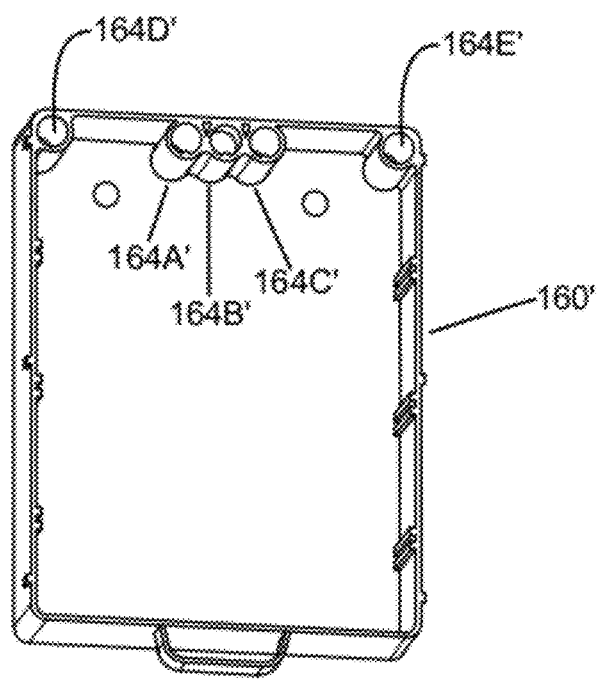
FIG. 22 illustrates an embodiment of a box for a system as in FIG. 11, in which the post receptacles are inside the box, on the inner side of the box wall.

While the box 160 has the post receptacles on the outside of the box, the receptacles can alternatively be fabricated in an internal box position. FIG. 22 illustrates an embodiment of a box 160' in which the post receptacles 164A', 164B' and 164C' are inside the box, on the inner side of the box wall. This embodiment also includes receptacles 164D' and 164E' located in corners of the box, providing additional placement flexibility in locating the camera post(s).

Exemplary features and advantages of at least some of the systems described above include one or more of the following:
 a) self-contained;
 b) auto positioning of documents of various sizes;
 c) single flexible webcam for electronic capture (scan) and/or video telephony;
 d) single or multiple camera allows for simultaneous usage for any combination of electronic capture of data (scan), video telephony and/or video presentations with a single unit;
 e) receiver box for storage of captured documents;
 f) a self-contained and portable unit for attachment to a computer for the electronic capture of documents, video telephony or video presentations;
 g) a single flexible webcam may be used for electronic capture (scan) or video telephony by merely adjusting the webcam;
 h) modular connections for interchangeability of camera heads for desired functionality. The system of FIGS. 11-22 is capable of handling one or more posts for camera mounts. This for example could be used for capturing images simultaneously with multiple document cameras or document and video presentation/video telephony applications;
 i) auto-positioning for numerous sizes of documents up to letter size, by use of the partition 168. The receiver box or drawer may be larger than 8.5"×11.0" to accommodate laminated letter sized documents. Partitions may be inserted to reduce the document drawer bed size for auto-positioning of smaller documents. This allows for quick collection of data, e.g., by using scan sheets in areas where setting up a computer data center is impractical due to power requirements, space limitations, and/or economic conditions.
 j) the system is adaptable to accommodate larger documents. A document bed capable of accepting legal-sized (8.5"×14.0") documents or larger is attained by using the box upside down with the lid attached to it;
 k) keyed post receptacles provide stability for camera positioning;

l) larger boxes to accommodate legal sized documents may be provided.

m) ribbing on the underside of the lid ensures proper placement of the lid to securely hold the necessary electronic capture tools or assemblies.

Figure 23:
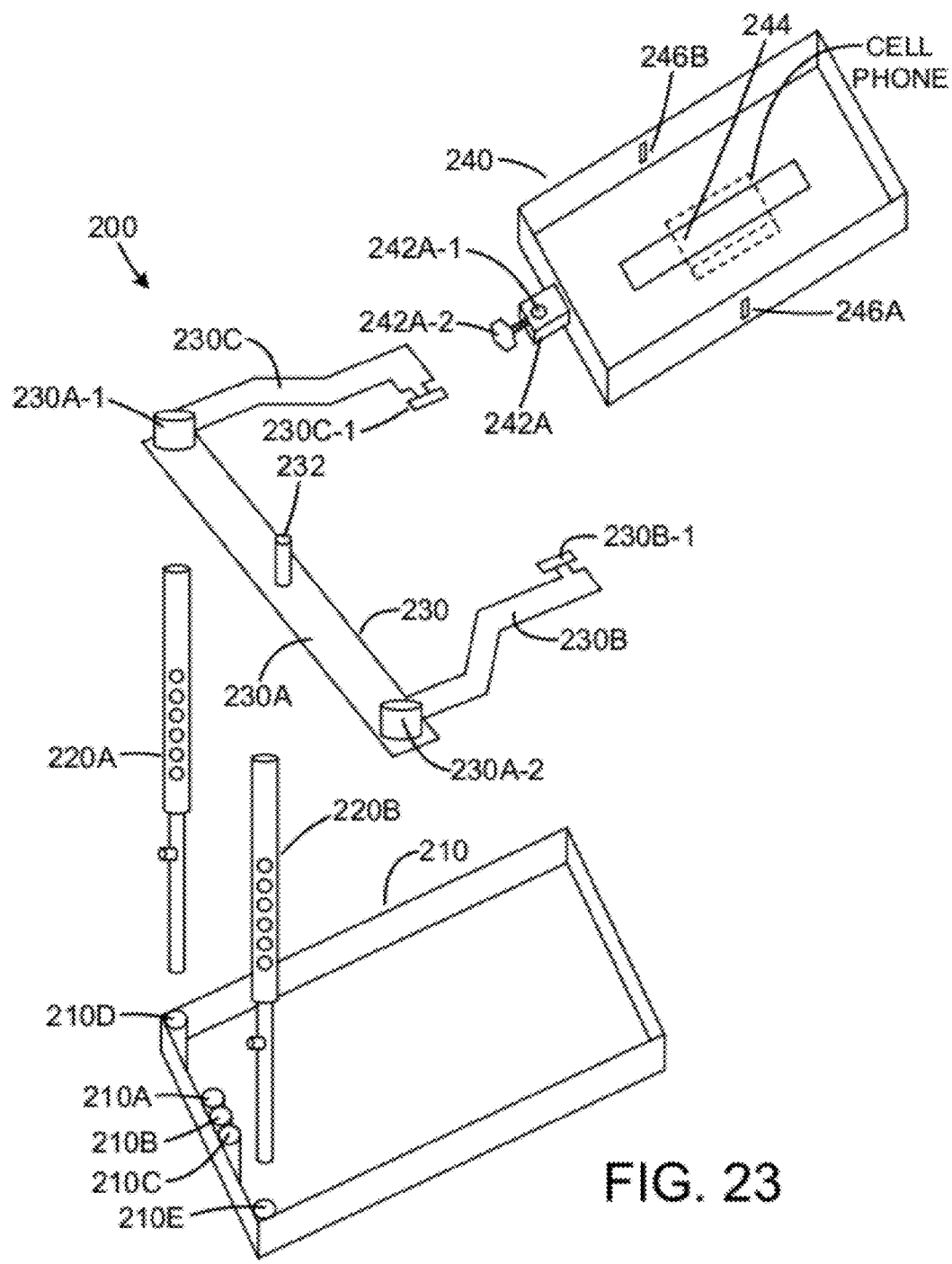
FIG. 23 is an exploded diagrammatic isometric view of an exemplary embodiment of a scan stand system/kit for use with a digital camera or cell phone camera as the image capture device.
Figure 24:
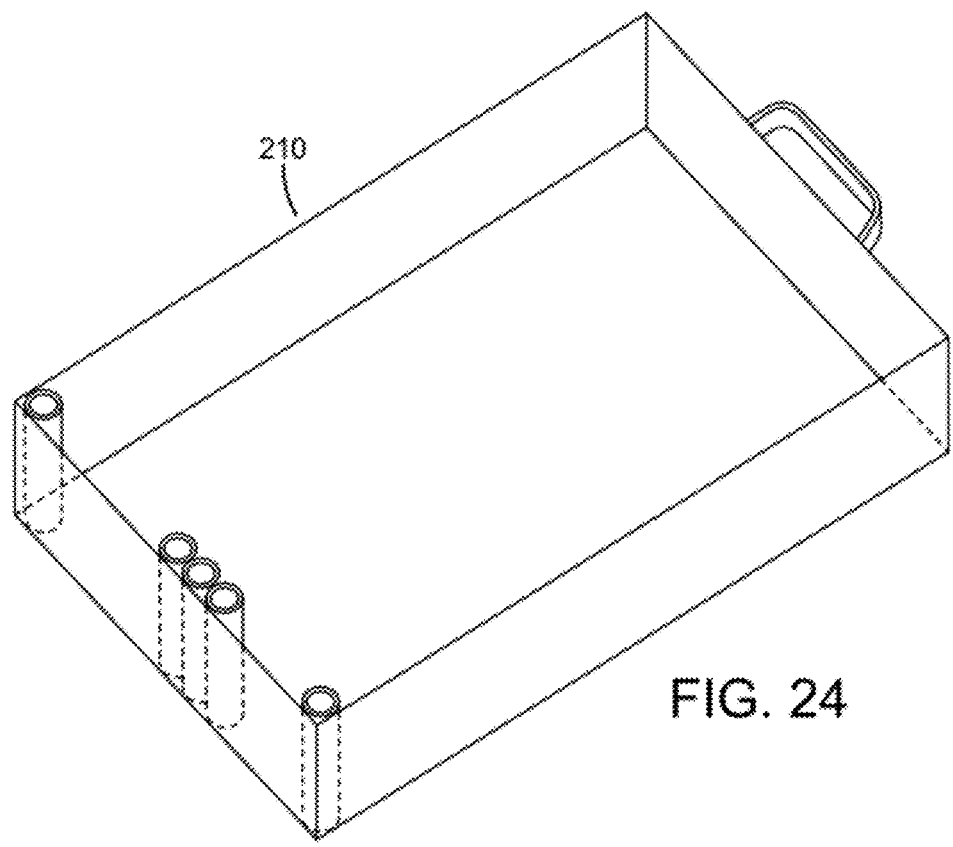
FIG. 24 is an isometric view of the base box for the system of FIG. 23.
Figure 25:
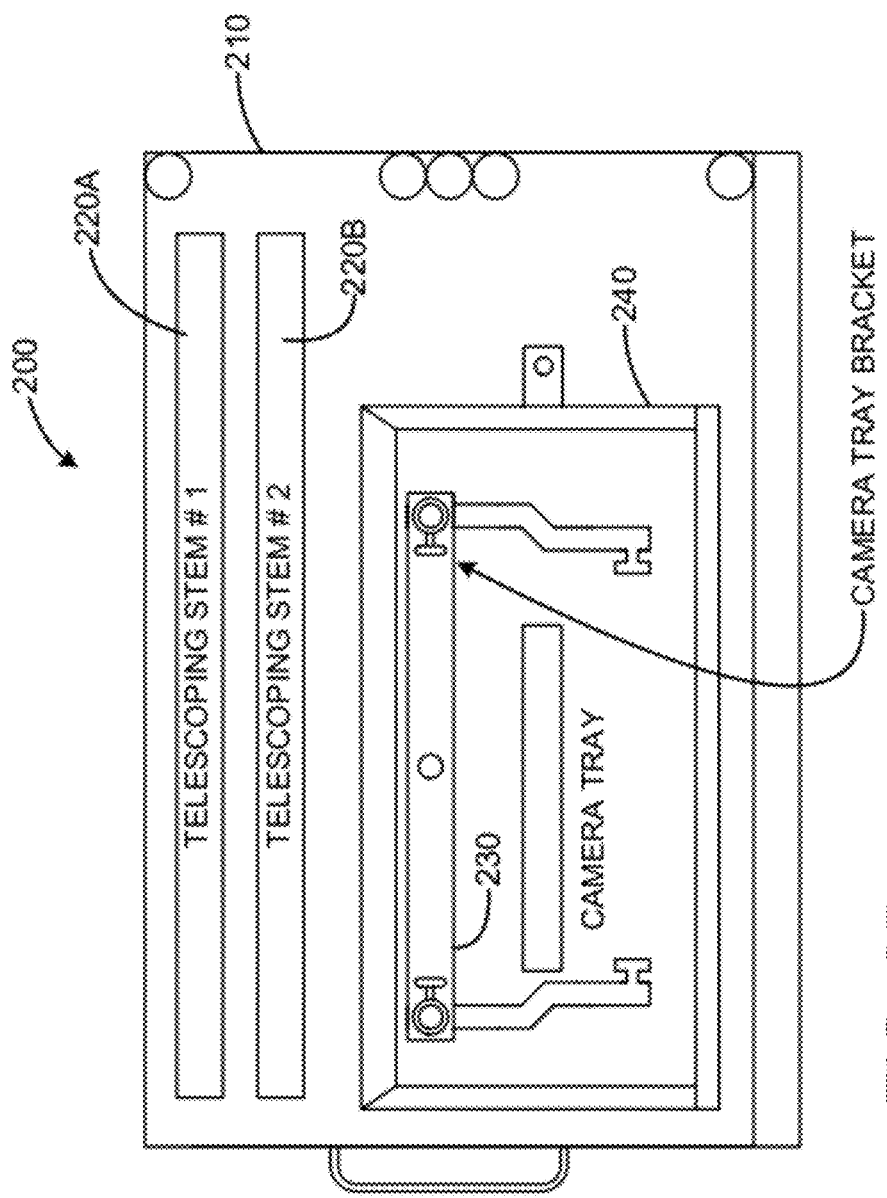
FIG. 25 is a top isometric view of the base box of FIG. 23, with the camera tray, the tray mounting bracket and the telescoping stems in a storage position in the base box.

Another embodiment of a scan stand system 200 is illustrated in FIGS. 23-25. This exemplary embodiment may be a stand-alone kit with the image capture device as a cell phone with an integrated digital camera, or a stand-alone digital camera. The kit 200 provides many of the same features as described above regarding the embodiments of FIGS. 1-22, including portability, auto-document positioning, adjustable heights to allow for best camera distance dependent upon phone type, adjustable leveling of camera tray to allow for keystone correction, convenience in operation (once the cell phone is set in position, just position document and shoot). The scan box can be turned upside down to allow for a larger scan bed, and using partitions, the kit can allow for auto-positioning of smaller documents. Further, the kit can be broken down (disassembled) and the components stored into the scan box with the lid installed for portability. Since the image capturing device is a cell phone or digital camera with its own battery power source, the kit is environmentally friendly, as a power source such as batteries are not required for the kit.

The kit 200 includes a scan box 210 with post/stem receptacles 210A-210E. The box 210 can be identical to box 160' (FIG. 22). The tray 210 holds a letter sized paper with up to ¼ inch lamination borders, although other lengths may be employed. The box 210 will typically be supplied with a lid as in the embodiment shown in FIG. 17, for example, but which is not shown for clarity in FIG. 23. In this exemplary embodiment, only receptacles 210D and 210 are used to support the telescoping stems 220A, 220B, which may be hollow cylinders. A mount bracket 230 is configured to install onto the top ends of the stems 220A, 220B, and includes a transverse section 230A and bracket arms 230B and 230C extending from the ends of the transverse section. The transverse section 230A has opening formed in each end capped by cap members 230A-1 and 230A-2, configured to accept the ends of the stems 220A and 220B in an assembled condition.

The kit 230 further includes a phone/camera tray 240 configured to attach to the mount bracket 230. The tray has vertical slots 246A, 246B formed in the opposed side walls of the tray 240, through which thumbscrews 230B-1 and 230B-2 at the ends of the bracket arms 230A, 230B may be passed to mount the tray 240. An exemplary embodiment of the kit 200 provides a stable platform to allow the user to utilize his or her own cell phone camera as an electronic image capture device, which may be positioned on the tray with the camera lens exposed through slot 244 formed in the base of the tray. The slot 244 is elongated to allow the cell phone or camera to be placed at a range of positions along the longitudinal slot length. The slot 244 may take other forms such as multiple holes to allow for optimal viewing. The tray 210 ideally holds a letter sized paper with up to ¼ inch lamination borders.

The telescoping stems 220A, 220B can be adjusted in length to allow the user to adjust the height of the cell camera tray 240, which is supported on the stems by mount bracket 230. This allows the user to obtain an optimal viewing area for electronically captured images, as the focal distance for documents to be imaged, e.g. 8.5×11 (letter) size, is typically not the same for all cell cameras.

A bracket boss or blade 232 on the mount bracket 230 mates with an opening or slot 242A-1 on a tongue 242A extending from an end wall on the cell camera tray 240, and, with a thumbscrew 242A-2, allows the user to adjust top-to-bottom tilt of the tray 240 and the cell phone camera being supported on the tray. Thumbscrews 230B-1 and 230C-1 and slots 246A, 246B allow side to side adjustment to fix the tray 240 in a desired position on the bracket 230. The three thumbscrews provide adjustment to eliminate any keystone issues with the positioning of the cell phone camera.

With the kit 200, users will be able to save electronic files of important documents as well as photos of valuable items which are supported on or in the box 210.

Figure 26:
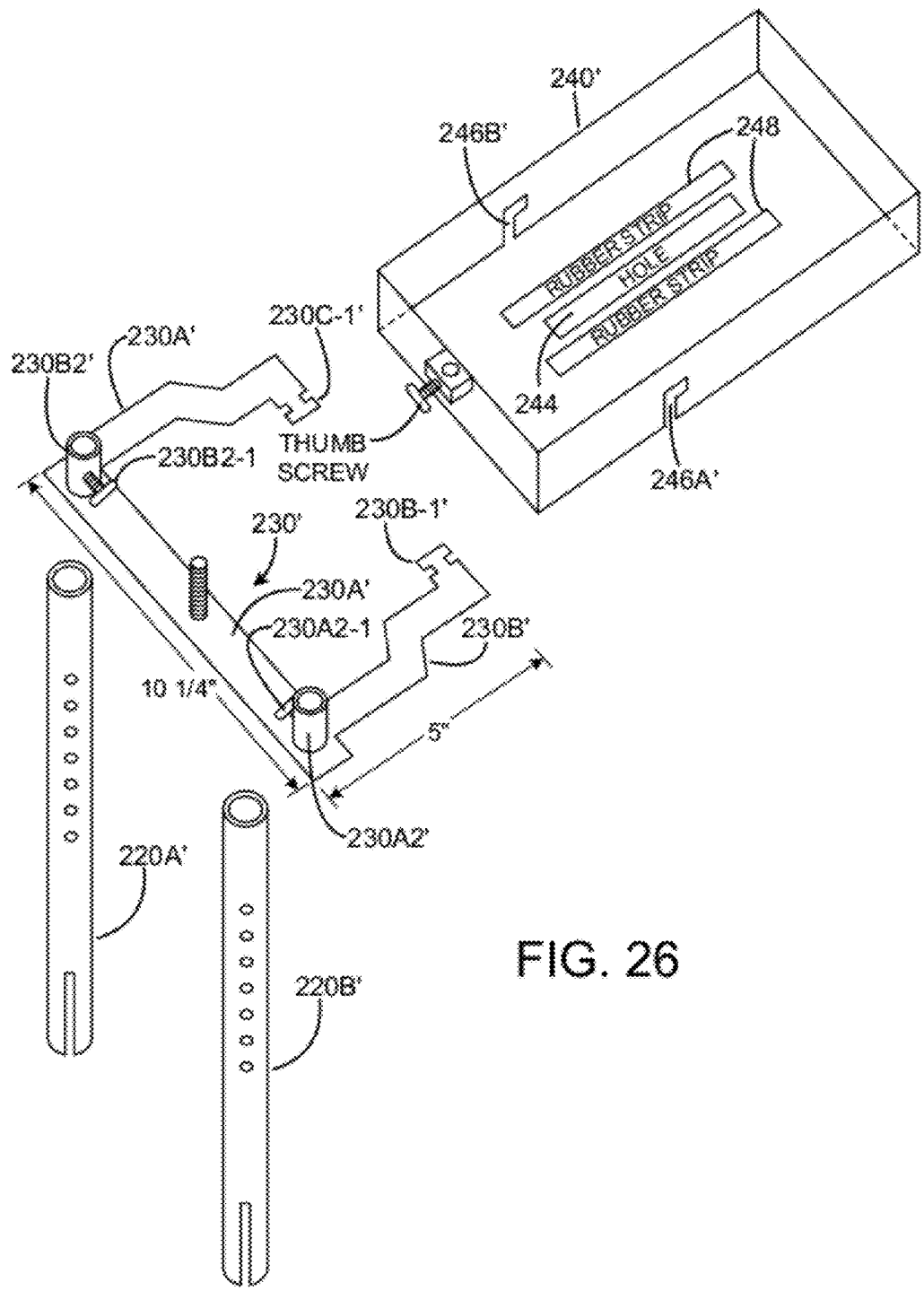
FIG. 26 is an exploded diagrammatic view of an alternate embodiment of the telescoping stems, mounting bracket and phone/camera tray for a cell phone camera image capture kit.

FIG. 26 shows an alternate embodiment of the stems, bracket and cell phone/camera tray for the kit 200. In this embodiment, the stems 220A' and 220B' are not telescoping, but have a series of holes formed along the length. The mount bracket 230' is formed with open bosses 230A2' and 230B2' (instead of closed caps) which receive the stem ends and allow the bracket to slide along the length of the stems. By extending thumbscrews 230A-2 and 230B'2 into selected holes on the stems, the height of the mount bracket above the scan box 210 (FIG. 23) can be adjusted and fixed.

Still referring to FIG. 26, the slots 246A' and 246B' in the cell phone/camera box 240' are L-shaped, to allow some front-to-rear movement of the box 240' toward and away from the stems. Rubber strips 248 may be applied to the bottom surface of the tray 240' along each side of the hole(s) 244' to prevent inadvertent sliding of the camera when placed on the tray during an image capture operation.

Figure 27A:
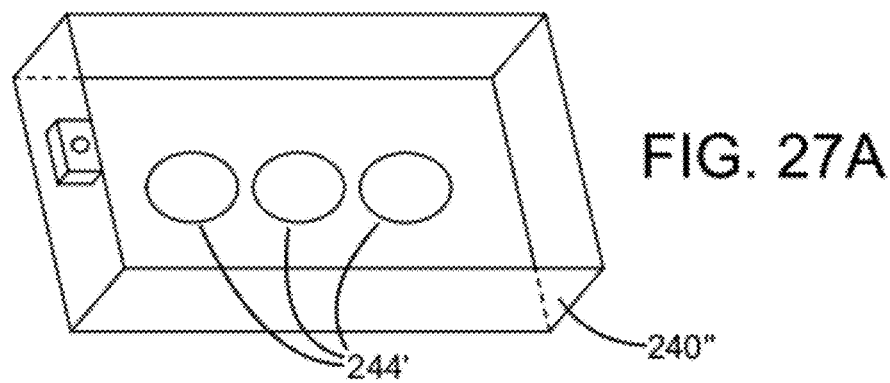
FIGS. 27A, 27B and 27C illustrate alternate embodiments of the cell/camera tray, with alternate cell/camera viewing slots/placement in the tray bottom surface.
Figure 27B:
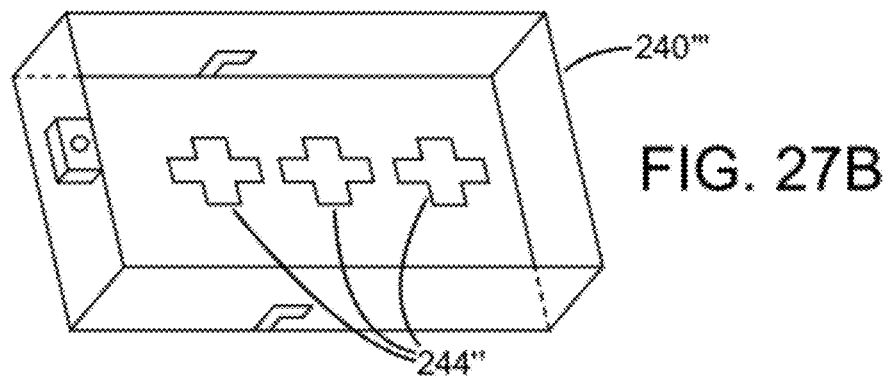
Figure 27C:
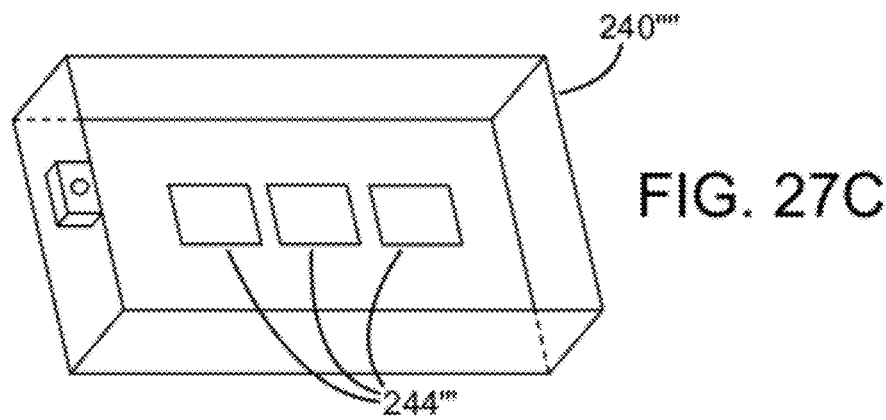

FIGS. 27A, 27B and 27C illustrate alternate embodiments of the cell/camera tray, with alternate cell/camera viewing slots/placement in the tray bottom surface. The tray 240" (FIG. 27A) has three spaced circular openings 244'. The tray 240'" (FIG. 27B) has three cross-shaped viewing openings 244". The tray 240'" (FIG. 27C) has three rectangular viewing openings 244".

In operation, the cell phone camera lens and flash, or digital camera lens and flash would be positioned over the desired opening (244) in the cell/camera tray (240). The image capture is then performed either by activating the appropriate snapshot control or device on the cell phone or camera; some cameras have a remote snapshot activator. This will be a function of the particular cell phone or camera selected for use with the kit.

Figure 28:
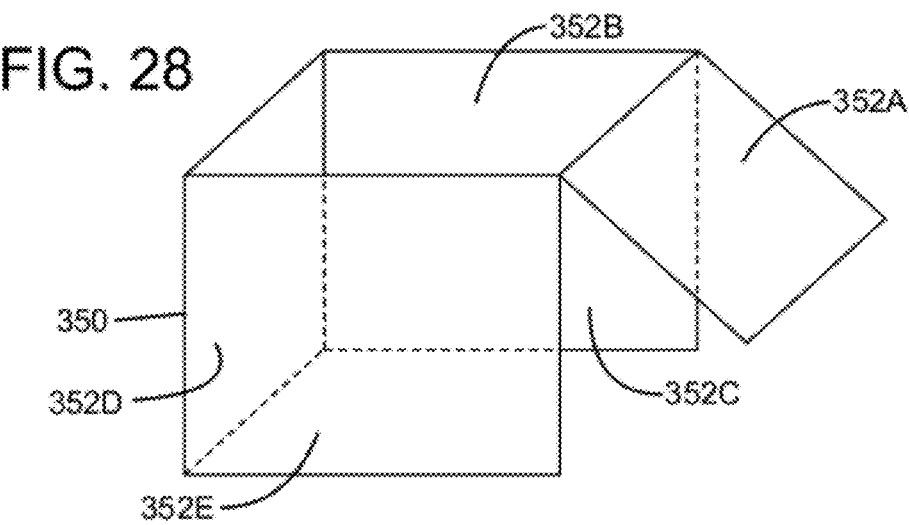
FIG. 28 shows an exemplary embodiment of a light shielding structure for use with an exemplary embodiment of a scan stand system.
Figure 29:
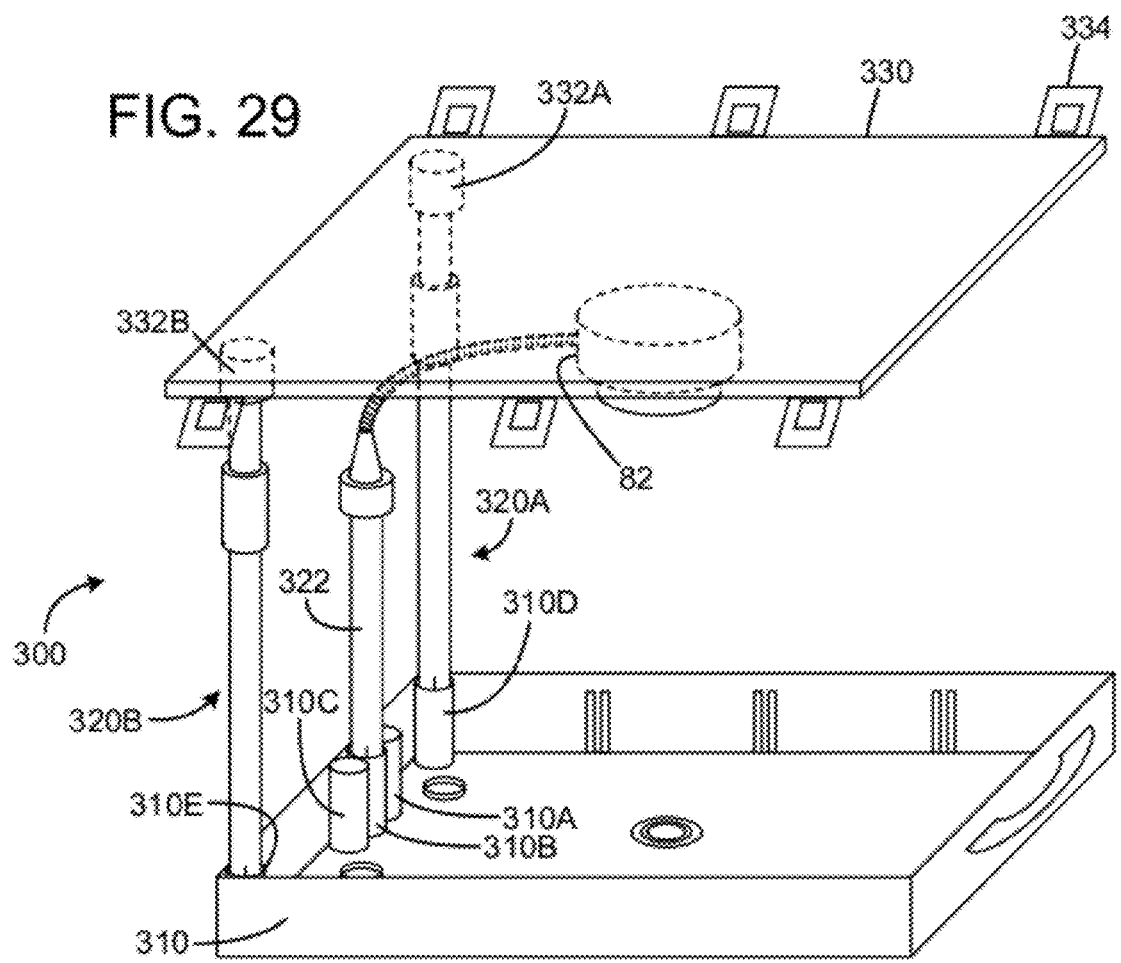
FIG. 29 illustrates a further exemplary embodiment of a scan stand system.
Figure 30:
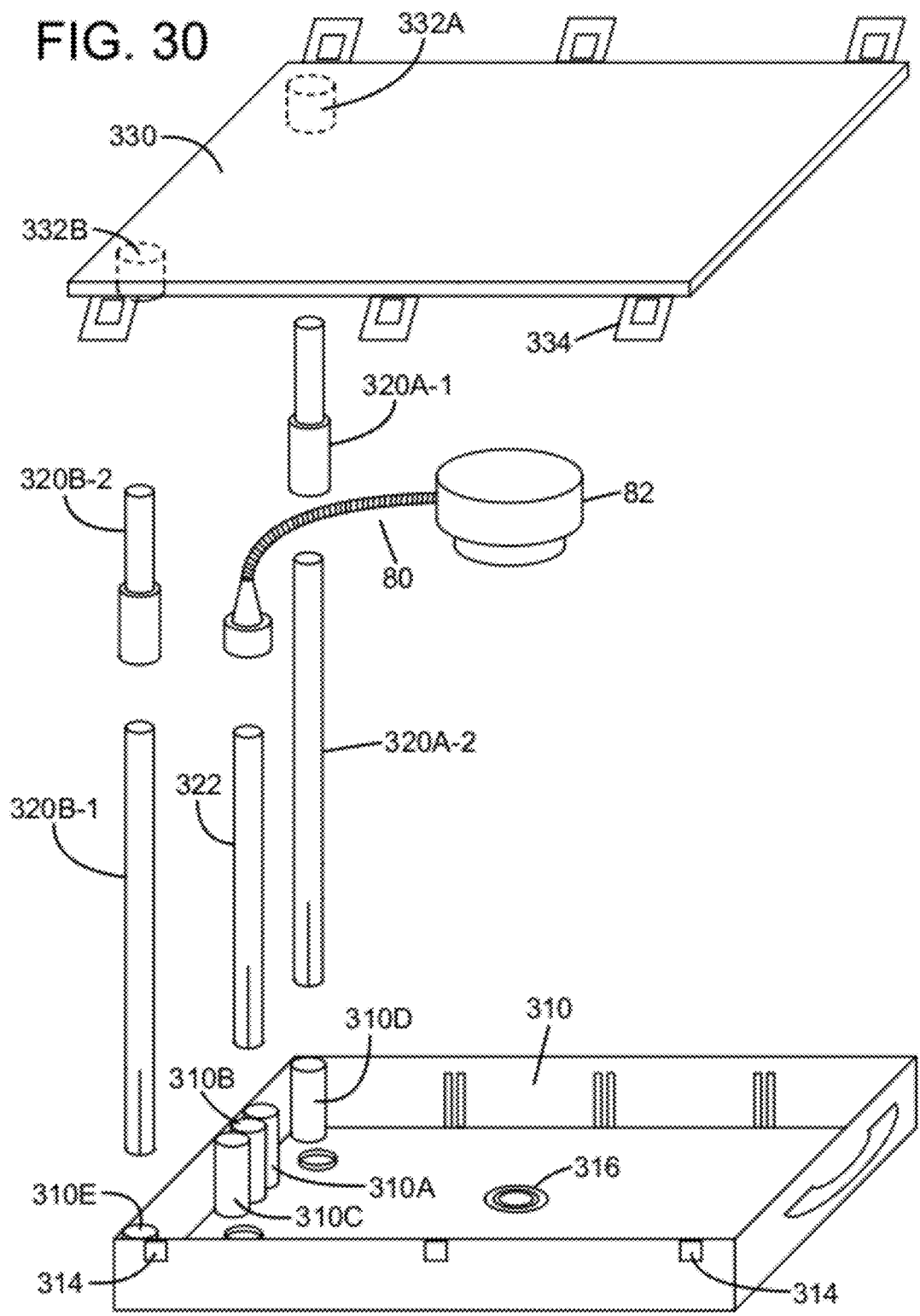
FIG. 30 is an exploded view of the scan system of FIG. 29.

Another exemplary embodiment of a scan kit system 300 is shown in FIGS. 28-30. In this exemplary embodiment, the lid 330 and post system are configured to support the lid in an elevated position above the camera 80. A light shielding structure 350 is configured to fit over the elevated lid 330 and be supported by the lid in an operational mode. In an exemplary embodiment, the light shielding structure 350 is made of a thin, lightweight translucent material, such as polyester taffeta or rip-stop nylon. The light shielding structure is configured to control the lighting environment for an imaging procedure.

In an exemplary embodiment, the light shielding structure 350 has an open bottom, and front side flap 352A. The structure 350 has top wall 352B and remaining side walls 352C, 352D and 352E. The structure 350 is collapsible to fit inside the box 310 in a storage configuration, and when expanded it fits over the assembled kit to provide a light shade mechanism. In an exemplary embodiment, the front flap 352A is shorter than the other side walls, providing a space adjacent the bottom to feed in documents to be scanned. The light shielding structure 350 may be optional for many applications, but may be useful in difficult lighting environments.

The lid 330 has stem receptacles or bosses 330A, 330B molded into the underside of the lid. The lid 330 will fit onto the box 310 one way in a storage position, with the downward facing receptacles 332A, 332B disposed at the opposite end of the box from the post receptacles 310A-310E.

The lid 330 has tabs 334 protruding from the side edges of the lid, positioned to interact with protrusions 314 on the box. The tabs 334 in this exemplary embodiment are connected to the side edges of the lid by living hinges, permitting rotation of the tabs downwardly to snap onto the protrusions 314 on the box to fix the lid in position on the box.

The post stems 320A, 320B for the kit 300 are two pieces each, to provide a plurality of heights of the lid 330 (if needed), and also so that so the post stems will also fit into the box 310 for storage. A camera post 322 supports the camera 80 in a similar fashion to that described above for the embodiment of FIG. 1.

Figure 31:
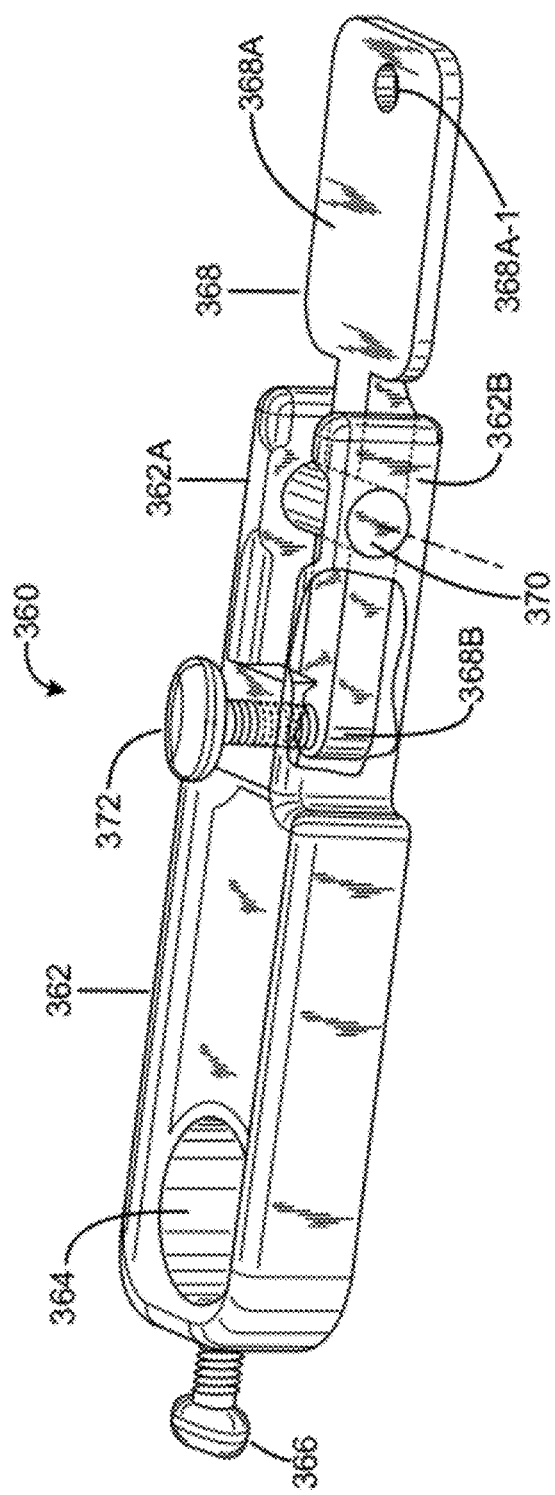
FIG. 31 illustrates another exemplary embodiment of a bracket structure configured to attach to a post member and to a camera.

As an alternative to the flexible gooseneck for the camera 82, a bracket 360 (FIG. 31) may be employed. The bracket has a main bracket arm portion 362, which has an opening 364 formed at one end thereof and sized to receive a support post such as post 322 (FIG. 29). The bracket 360 can be fitted onto the post 322, and its height position fixed by use of thumbscrew 366. The opposite end of the main bracket arm 362 forms a U-shaped structure with spaced arms 362A, 362B. The bracket has a camera mount arm 368 pivotally mounted on pivot 370 between the ends of the arms 362A, 362B. A threaded opening 368A-1 is formed in the distal end of the mount arm, and is configured to attach to the tripod mount of a digital camera or webcam using a thumbscrew or the like. With the pivotal connection of the mount arm to the main bracket arm, thumbscrew 372 can be used to adjust the up/down position of the distal end of the mount arm, to adjust the position of the camera.

The kit may be used for additional uses, particularly with a higher quality camera or webcam. Such additional uses include electronic capturing of object(s) to be saved and used for later distribution such as:

i. taking pictures or videos of items, e.g. food plates, to be published on social media, websites, advertising material, etc.

ii. taking pictures or videos of items for posting on websites such as EBay, Amazon, etc.

iii. recording for archiving various activities, such as capturing the opening of packages by retailers to provide for verification of contents for articles received, e.g. jewelers receiving packages from clients.

Although the foregoing has been a description and illustration of specific embodiments of the subject matter, various modifications and changes thereto can be made by persons skilled in the art without departing from the scope and spirit of the invention.

What is claimed is:

1. A self-contained and portable scan stand kit for capturing images of documents and other objects, comprising:
   a receiver box defining a storage space and an open top, the receiver box having an attachment structure, and a bottom surface and side walls defining a storage space;
   a removable box lid configured to cover the open top and the storage space with the box lid positioned on the open top of the receiver box;
   a post system; and
   a digital imaging device configured to be supported by the post system above the box in an image scan position, the digital imaging device having a field of view sufficiently large to encompass a document or object positioned on or in the box;
   the post system and attachment structure configured to removably receive a first end of the post system to support the post system in an upright position, the attachment structure configured to permit the post system to be removed from the attachment structure for storage in the box;
   the post system further configured for disassembly to fit with the digital imaging device within the storage space in a storage configuration with the box lid positioned on the open top of the receiver box;
   wherein the attachment structure includes at least one receptacle at or adjacent said one of the side walls, and the first end of the post structure is configured to engage the at least one receptacle; and
   wherein the at least one receptacle includes a plurality of receptacles at spaced locations within the box at or adjacent said one of the side walls, said plurality including first and second corner receptacles disposed at opposed ends of said one of the side walls and a third receptacle disposed intermediate said opposed ends, to provide placement flexibility for the post system.

2. The kit of claim 1, wherein the at least one receptacle is configured with the post system to permit the at least one receptacle to receive the first end of the post system with the box disposed in an upright position on a work surface with the bottom surface adjacent the work surface, and with the box disposed in an inverted, upside-down position relative to the work surface with the open top of the box adjacent the work surface.

3. The kit of claim 1, wherein the post system is a telescoping post system configured to provide an adjustable height above the box for positioning the digital imaging device at a plurality of scan positions.

4. The kit of claim 1, wherein the post system includes a first post and an extension post configured to removably attach to the first post to provide a length extension of the post system, to provide a plurality of scan positions of the digital imaging device.

5. The kit of claim 1, further including a flexible gooseneck configured for attachment to the post system and connected to the digital imaging device, the flexible gooseneck configured to allow a user to move the digital imaging device to different scan positions above the box, with the gooseneck attached to the post system.

6. The kit of claim 1, wherein the digital imaging device includes a web camera (webcam).

7. The kit of claim 1 wherein the digital imaging device includes an electronic connection for electronic transfer of a captured image to a computer system.

8. The kit of claim 7, wherein the electronic connection is a cable connected to the digital imaging device and having a connector for connection to a computer.

9. The kit of claim 1, further comprising a target image disposed on the bottom wall of the box for use in manually adjusting a focus of the digital imaging device.

10. The kit of claim 1, wherein the box further includes a set of partition slots disposed on opposite ones of the side walls and configured to receive and support a box partition for auto-positioning of documents within the box, by reducing a size of the storage volume to configure the box to support a document or other object of a footprint size smaller than the bottom wall in a position to be scanned by the digital imaging device.

11. The kit of claim 1, further comprising:
   an imaging device support bracket or tray configured for removable attachment to the post system to be supported by the post system, the support bracket or tray having an opening formed in a bottom surface thereof, the support bracket or tray arranged to support the digital imaging device with its field of view through the tray opening.

12. A self-contained and portable scan stand kit for capturing images of documents and other objects, comprising:
- a receiver box defining a storage space and an open top, the receiver box having an attachment structure, and a bottom surface and side walls defining a storage space;
- a removable box lid configured to cover the open top and the storage space with the box lid positioned on the open top of the receiver box;
- a post system; and
- a digital imaging device configured to be supported by the post system above the box in an image scan position, the digital imaging device having a field of view sufficiently large to encompass a document or object positioned on or in the box;
- the post system and attachment structure configured to removably receive a first end of the post system to support the post system in an upright position, the attachment structure configured to permit the post system to be removed from the attachment structure for storage in the box;
- the post system further configured for disassembly to fit with the digital imaging device within the storage space in a storage configuration with the box lid positioned on the open top of the receiver box;
- wherein the attachment structure includes at least one receptacle at or adjacent said one of the side walls, and the first end of the post structure is configured to engage the at least one receptacle;
- wherein the at least one receptacle is configured with the post system to permit the at least one receptacle to receive the first end of the post system with the box disposed in an upright position on a work surface with the bottom surface adjacent the work surface, and with the box disposed in an inverted, upside-down position relative to the work surface with the open top of the box adjacent the work surface; and
- wherein the lid is configured to attach to the box in the inverted, upside-down position in a cantilevered arrangement to extend a scan bed area.

13. A portable scan stand kit for capturing images of documents and other objects, comprising:
- a receiver box defining a storage space and an open top, the receiver box having a bottom surface and side walls defining a storage space;
- a removable box lid configured to cover the open top and the storage space with the lid positioned on the open top of the receiver box;
- a post system; and
- a digital imaging device configured to be supported by the post system above the box in an image scan position, the digital imaging device having a field of view sufficiently large to encompass a document or object positioned on or in the box;
- the post system and digital imaging device further configured to fit within the storage space in an unassembled condition with the lid positioned on the open top of the receiver box in a storage configuration;
- a light shielding structure arranged to cover the digital imaging device in the image scan position, the post system and the box, the light shielding structure fabricated of a flexible material, and configured to be collapsible to a substantially flattened configuration to fit into the box in the storage configuration; and
- wherein the post system further comprises a lid support post system to removably attach to the lid structure to support the lid in an elevated position above the digital imaging device in the image scan position, the lid structure configured to support the light shielding structure.

14. The kit of claim 13, wherein the light shielding structure comprising a flap which may be lifted to access the interior of the light shielding structure.

15. The kit of claim 13, wherein the light shielding structure is fabricated of a translucent material.

* * * * *